US010829672B2

(12) United States Patent
Stansbury

(10) Patent No.: US 10,829,672 B2
(45) Date of Patent: Nov. 10, 2020

(54) WATER COMPATIBLE NANOGEL COMPOSITIONS

(71) Applicant: The Regents of the University of Colorado, Denver, CO (US)

(72) Inventor: Jeffrey W. Stansbury, Centennial, CO (US)

(73) Assignee: THE REGENTS OF THE UNIVERSITY OF COLORADO, Denver, CO (US)

( * ) Notice: Subject to any disclaimer, the term of this patent is extended or adjusted under 35 U.S.C. 154(b) by 0 days.

(21) Appl. No.: 15/845,905

(22) Filed: Dec. 18, 2017

(65) Prior Publication Data

US 2018/0105726 A1 Apr. 19, 2018

Related U.S. Application Data

(62) Division of application No. 14/386,873, filed as application No. PCT/US2013/032263 on Mar. 15, 2013, now Pat. No. 9,845,415.

(60) Provisional application No. 61/614,326, filed on Mar. 22, 2012.

(51) Int. Cl.
*C08F 220/18* (2006.01)
*C09J 133/14* (2006.01)
*C08F 220/20* (2006.01)
*C08F 265/06* (2006.01)
*C08J 9/00* (2006.01)

(52) U.S. Cl.
CPC ........... *C09J 133/14* (2013.01); *C08F 220/18* (2013.01); *C08F 220/20* (2013.01); *C08F 265/06* (2013.01); *C08J 9/00* (2013.01); *C08J 2205/02* (2013.01); *C08J 2333/14* (2013.01)

(58) Field of Classification Search
CPC ...... C09J 133/14; C08F 220/18; C08F 265/06
See application file for complete search history.

(56) References Cited

U.S. PATENT DOCUMENTS

2006/0074186 A1   4/2006  Barron et al.
2009/0099301 A1   4/2009  Naraghi et al.

FOREIGN PATENT DOCUMENTS

WO   99/46310 A1     9/1999
WO   2008/071661 A1  6/2008

OTHER PUBLICATIONS

"Control of polymerization shrinkage and stress in nanogel-modified monomer and composite materials," Moraes et al., Dental Materials 27 (2011), pp. 509-519. (Year: 2011).*
Stansbury et al. "Improved Dental Adhesive Formulations Based on Reactive Nanogel Additives," Journal of Dental Research 91 (2): 179-184. Oct. 21, 2011. (Year: 2011).*
"Hydrophilic Monomers for Research Applications", Data Sheet from Polysciences, Inc., 2016, 2 pages.
Dailing et al., "Construction of Monomer-free, Highly Crosslinked, Water-compatible Polymers", Research Reports Biomaterials and Bioengineering, 2014, pp. 1326-1331, vol. 93 No. 12.
Dailing et al., "Photopolymerizable nanogels as macromolecular precursors to covalently crosslinked water-based networks", Soft Matter, 2015, pp. 5647-5655, vol. 11, The Royal Society of Chemistry.
Dvorakova et al., "Molecularly Imprinted Nanospheres by Nonaqueous Emulsion Polymerization", Macromolecular Rapid Communications, 2010, pp. 2035-2040, vol. 31.
GPS Safety Summary for Isobornyl Methacrylate from Evonik Industries, Sep. 2013.
Graham et al., "Nanogels and Microgels: The New Polymeric Materials Playground", Pure and Applied Chemistry, 1998, pp. 1271-1275, vol. 70 No. 6.
Isaure et al., "Facile Synthesis of Branched Poly(Methyl Methacrylate)s", Journal of Materials Chemistry, 2003, pp. 2701-2710, vol. 13.
Montheard et al., "Homopolymers and Copolymers of 2-Hydroxyethyl Methacrylate for Biomedical Applications", Desk Reference of Functional Polymers Syntheses and Applications, 1997, Chapter 5.3, pp. 699-717, American Chemical Society.
Poly et al., "Reinforcing the Hydrophobicity of Polymeric Surfaces from Fluorinated Star Polymers and Nanogels", Macromolecules, 2010, pp. 1299-1308, vol. 43.
Rouzeau et al., "Criteria for the Preparation of Cross-Linked Poly(Meth)acrylate Microparticles by Solution free Radical Polymerization", European Polymer Journal, 2007, pp. 4398-4414, vol. 43.
Szaloki et al., "Preparation of Reactive Polymeric Nanoparticles (RPNPs)", Colloid and Polymer Science, 2008, pp. 435-444, vol. 286.
Czerner, M., et al., "Determination of Elastic Modulus of Gelatin Gels by Indentation Experiments," Procedia Materials Science 8 (2015) 287-296.
Dailing, E., et al., "Nanogels as a Basis for Network Construction," Macromol. Symp. 2013, 329, 113-117.
Dailing, E., et al., "Construction of Monomer-free, Highly Crosslinked, Watercompatible Polymers," J Dent Res (2014) 93(12): 1326-1331.
Gotti, V., et al., "Influence of nanogel additive hydrophilicity on dental adhesive mechanical performance and dentin bonding," Dental Materials 32 (2016): I406-I413.
Hoshika, T., et al., "Effects of quaternary ammonium-methacrylates on the mechanical properties of unfilled resins," Dental Materians 30 (2014): I213-I223.
Konidari, M., et al., Moisture-Induced Effects on the Tensile Mechanical Properties and Glass-Transition Temperature of Poly(vinyl alcohol) Films, Journal of Applied Polymer Science, vol. 120 (2011): 3381-3386.
St. Lawrence, S., et al., Effect of moisture on the tensile properties of poly(hydroxy ester ether), Polymer 42 (2001): 5643-5650.
Vats, K., et al., Nanoscale physicochemical properties of chain- and step-growth polymerized PEG hydrogels affect cell-material interactions, J Biomed Mater Res Part A (2017) 105A: 1112-1122.

(Continued)

Primary Examiner — Kara B Boyle
(74) Attorney, Agent, or Firm — Cantor Colburn LLP

(57) ABSTRACT

The present invention relates to preparation and use of water dispersible nanogels and solvent dispersible reactive nanogels as additives to enhance polymer properties or as precursors to polymeric networks.

12 Claims, 17 Drawing Sheets

(56) References Cited

OTHER PUBLICATIONS

Saraswathy et al., "Water dispersible siloxane nanogels: a novel technique to control surface characteristics and drug release kinetics", J. Mater. Chem. B, 2016, pp. 5299-5307, vol. 4.

* cited by examiner

WATER COMPATIBLE NANOGEL COMPOSITIONS

RELATED APPLICATIONS

This application is a divisional application of U.S. Ser. No. 14/386,873, filed on Sep. 22, 2014, now U.S. Pat. No. 9,845,415, which is the U.S. National Stage of International Application No. PCT/US2013/032263, filed on Mar. 15, 2013, which claims priority to U.S. Provisional Application Ser. No. 61/614,326 filed Mar. 22, 2012, each of which is hereby incorporated by reference in its entirety.

STATEMENT REGARDING FEDERALLY SPONSORED RESEARCH OR DEVELOPMENT

This invention was made with government support under grant numbers DE020480 and DE014227 awarded by the National Institutes of Health. The government has certain rights in the invention.

BACKGROUND OF THE INVENTION

Field of the Invention

The present invention relates to preparation and use of water compatible and solvent dispersible reactive nanogels as additives to enhance polymer properties or as precursors to polymeric networks.

Description of the Related Art

There has been considerable recent interest in nanogels based on the diversity of compositions and synthetic routes that can be accommodated. (Dvorakova, 2010; Graham, 1998; Isaure, 2003; Rouzeau, 2007; Szaloki, 2008).

Prior work dedicated to nanogel additives applied to dental polymers has spanned from resins and composite materials (Moraes, 2011a) to adhesives and sealants. In much of the previous work, nanogel materials were developed with hydrophobic components, which meant the nanogels could be dispersed in suitable organic solvents or in relatively nonpolar resin systems, but not adequately in water, aqueous compositions or polar resin systems. Therefore, water dispersible nanogels are desirable.

In addition, since mechanical properties of polymers prepared with inert nanogel additives were found to be compromised, methods to regioselectively attach reactive groups to chain-ends or throughout the nanogel structures are desirable to improve upon the mechanical properties of polymers prepared from polar compositions.

SUMMARY OF THE INVENTION

The disclosure provides methods to achieve water dispersible or water compatible nanogels that can be used as reactive additives in monomer and resin systems or as 3D macrogel polymer precursors in monomer-free water-based applications.

In one embodiment, the disclosure provides a water dispersible nanogel produced by a process comprising: (i) combining a monomer mixture comprising at least one monovinyl monomer, at least one divinyl monomer, a difunctional chain transfer agent, and an initiator; and (ii) polymerizing said mixture to form a water dispersible nanogel.

In one aspect, the divinyl monomer in the monomer mixture is selected from one or more of ethylene glycoldi(meth)acrylate, tetraethyleneglycoldi(meth)acrylate (TTEGDMA), urethane dimethacrylate (UDMA), the condensation product of bisphenol A and glycidyl (meth)acrylate, 2,2'-bis [4-(3-methacryloxy-2-hydroxy propoxy)-phenyl] propane (bis-GMA), ethoxylated bisphenol-A-di(meth)acrylate (BisEMA), hexanediol di(meth)acrylate, polyethyleneglycol dimethacrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, allyl (meth)acrylate, divinyl benzene, bis (meth)acrylamide, and 1,3-diglycerolatediacrylate.

In a specific aspect, the divinyl monomer in the monomer mixture is tetraethyleneglycol di(meth)acrylate (TTEGDMA), ethoxylated bisphenol-A-di(meth)acrylate (BisEMA), or polyethyleneglycol dimethacrylate. In another aspect, the polyethoxy ethyl methacrylate (EHEMA) is polyethoxy (10) ethyl methacrylate (E10 HEMA). In a specific aspect, the polyethoxy (10) ethyl methacrylate (E10 HEMA) is present in from 50 mol % to about 90 mol % compared to the mols of monomer in the monomer mixture.

In one aspect, the monovinyl monomer is selected from one or more of the group consisting of (meth)acrylates and acrylates, styrene and derivatives thereof (styrenics), vinyl acetate, maleic anhydride, itaconic acid, N-alkyl (aryl) maleimides and N-vinyl pyrrolidone, vinyl pyridine, acrylamide, methacrylamide, N,N-dialkylmethacrylamides and acrylonitrile.

In one embodiment, said monovinyl monomer is polyethoxy ethyl methacrylate (EHEMA).

In another embodiment, the disclosure provides a method to improve adhesive polymer wet flexural strength, the method comprising (i) combining a first monomer mixture comprising at least one functional monomer, at least one divinyl monomer, a difunctional chain transfer agent, and an initiator; (ii) polymerizing said first monomer mixture to form a functionalized nanogel; (iii) reacting the functionalized nanogel with a reactive olefinic compound to form a reactive nanogel with pendant olefinic groups; (iv) adding the reactive nanogel to an adhesive resin to create a second mixture; and (v) polymerizing the second mixture to provide an adhesive polymer with increased polymer wet strength compared to the adhesive polymer prepared from the adhesive resin without the added reactive nanogel. In one aspect, the pendant olefinic groups are selected from styryl, allyl, vinyl ether, and (meth)acrylate groups. In another aspect, the reactive olefinic compound is selected from (meth)acryloyl chloride, (meth)acrylic anhydride, (meth)acrylic acid, isocyanatoalkyl(meth)acrylate, isocyanatoethyl(meth)acrylate vinylbenzene chloride, chloroethyl vinyl ether, allyl chloride and isocyanatomethyl(meth)acrylate. In a further aspect, the difunctional chain transfer agent is selected from mercaptoethanol, mercaptopropanol, 3-mercapto-2-butanol, 2-mercapto-3-butanol, 3-mercapto-2-methyl-butan-1-ol, 3-mercapto-3-methyl-hexan-1-ol 3-mercaptohexanol, and 3-mercaptopropionic acid . In an aspect, the reactive nanogel is added in about 10 wt % to about 80 wt %, compared to the weight of the adhesive resin to enhance dry and wet flexural strength of the adhesive polymer. In an aspect, the reactive nanogel is added in about 50 wt % to about 80 wt %, compared to the weight of the adhesive resin to enhance dry and wet flexural strength of the adhesive polymer. In another aspect, the reactive nanogel is added in about 15 wt % to about 35 wt %, compared to the weight of the adhesive resin to enhance dry and wet flexural strength of the adhesive polymer. In another aspect, the reactive nanogel is added in about 15 wt % to about 50 wt %, compared to the weight of the adhesive resin to enhance dry and wet flexural strength of the adhesive polymer.

In another embodiment, the disclosure relates to a method to provide a monomer-free macroscopic polymer network, the method comprising (i) combining a first monomer mixture comprising at least one functional monomer, at least one divinyl monomer, a difunctional chain transfer agent, and an initiator; (ii) polymerizing said first monomer mixture to form a functionalized nanogel; (iii) reacting the functionalized nanogel with a reactive olefinic compound to form a reactive nanogel with pendant olefinic groups; (iv) adding the reactive nano gel to an inert matrix to create a second mixture; and (v) polymerizing the second mixture, in which the nanogel loading exceeds the percolation threshold, to provide a monomer-free macroscopic polymer network with the strength solely dependent on the nanogel structure and loading level within the inert matrix. In one aspect, the pendant olefinic groups are selected from styryl, allyl, vinyl ether, and (meth)acrylate groups. In one aspect, the reactive olefinic compound is selected from (meth)acryloyl chloride, (meth)acrylic anhydride, (meth)acrylic acid, isocyanatoalkyl(meth)acrylate, isocyanatoethyl(meth)acrylate vinylbenzene chloride, chloroethyl vinyl ether, allyl chloride and isocyanatomethyl(meth)acrylate. In another aspect, the difunctional chain transfer agent is selected from mercaptoethanol, mercaptopropanol, 3-mercapto-2-butanol, 2-mercapto-3-butanol, 3-mercapto-2-methyl-butan-1-ol, 3-mercapto-3-methyl-hexan-1-ol, 3-mercaptohexanol, 3-mercaptopropionic acid, and cysteine. In one aspect, the reactive nanogel is added in about 10 wt % to about 80 wt %, compared to the weight of the inert matrix. In one aspect, the reactive nanogel is added in about 50 wt % to about 80 wt %, compared to the weight of the inert matrix. In one aspect, the reactive nanogel is added in about 15 wt % to about 35 wt %, compared to the weight of the inert matrix. In one aspect, the reactive nanogel is added in about 15 wt % to about 50 wt %, compared to the weight of the inert matrix.

(*note: not completely controlled since the open nanogel film was somewhat thicker than the open nanogel free film).

Figure 5:
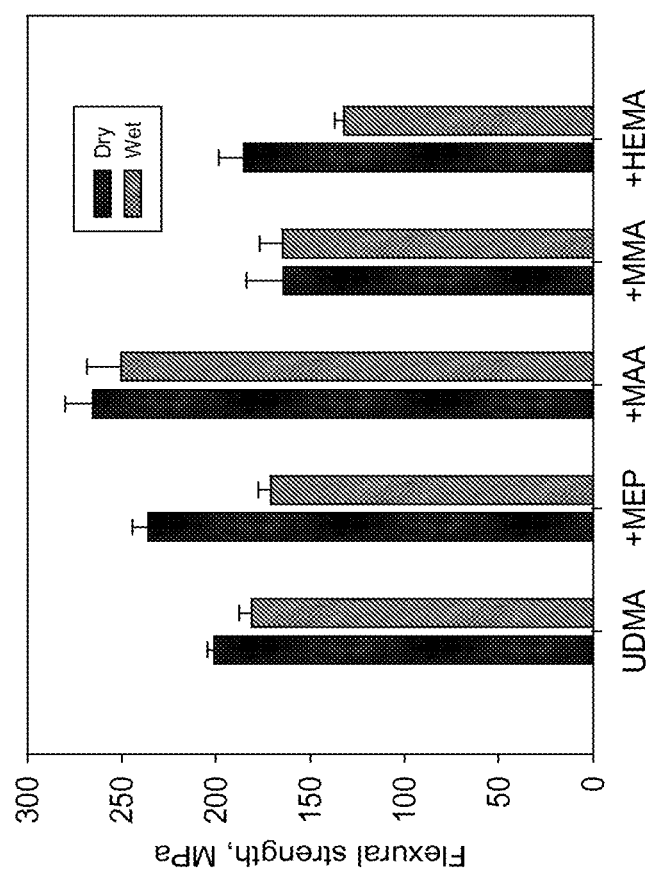

FIG. 5 illustrates dry/wet flexural strength (right) of UDMA homopolymer and copolymers (1:2 mole ratio) with methacryloylethyl phthalate (MEP), methacrylic acid (MAA), methyl methacrylate (MMA) and 2-hydroxyethyl methacrylate (HEMA). 3-point bend samples cured in a Triad light oven.

Figure 6:
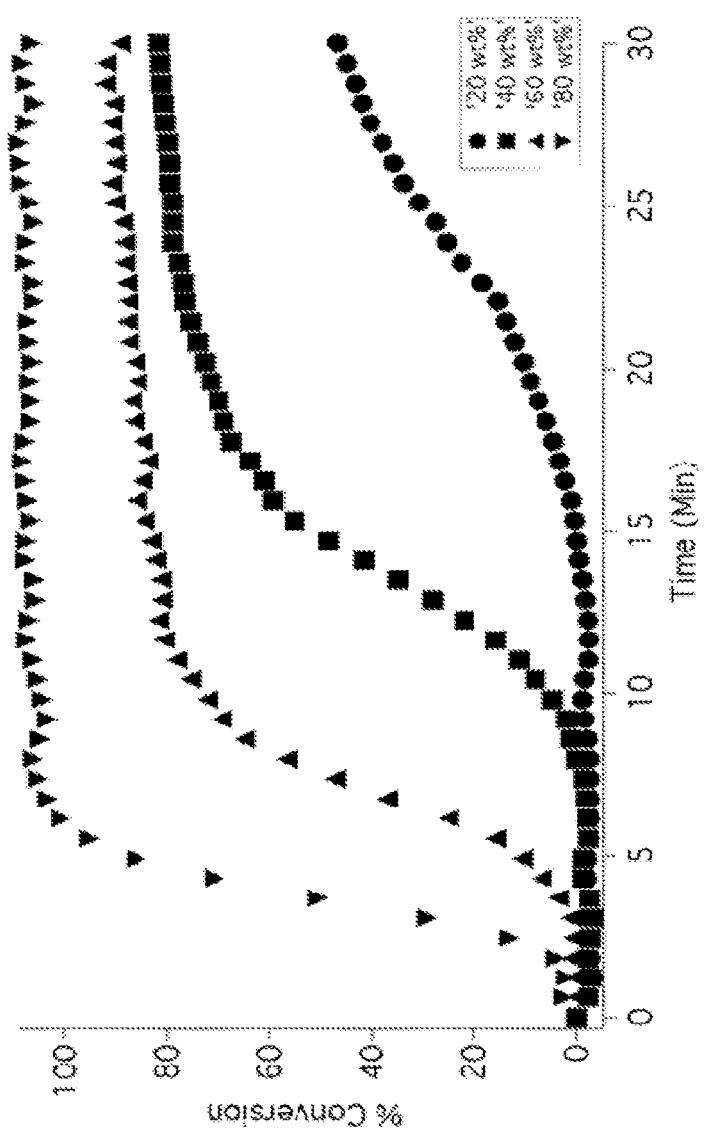

FIG. 6 illustrates functional group conversion upon polymerization of HEMA with increasing wt % EHEMA-TTEGDMA nanogels. 10 mW/cm$^2$, 365 nm, $t_0$=30 s. Under the standardized conditions used here, no significant conversion was observed up to 30 min for pure HEMA.

Figure 7:
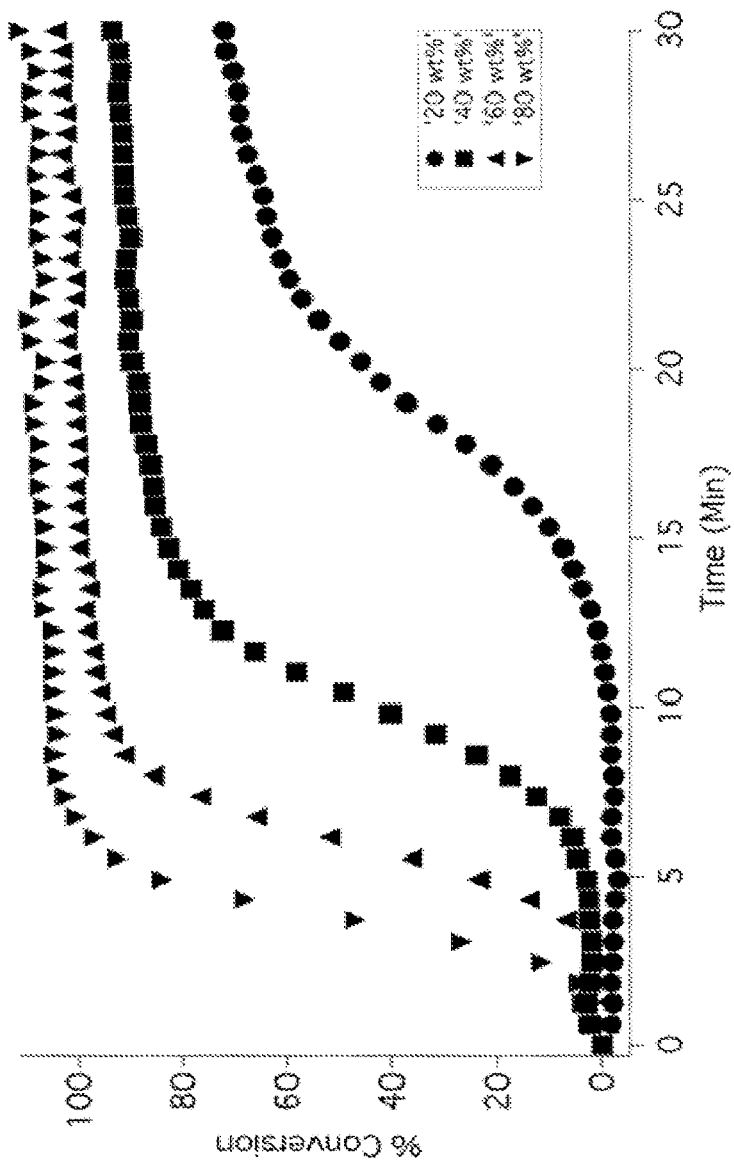

FIG. 7 illustrates functional group conversion upon photopolymerization of HEMA with increasing wt % EHEMA-PEG400DMA nanogels. 10 mW/cm$^2$, 365 nm, $t_0$=30 s. No conversion was observed at 30 min for pure HEMA.

Figure 8:
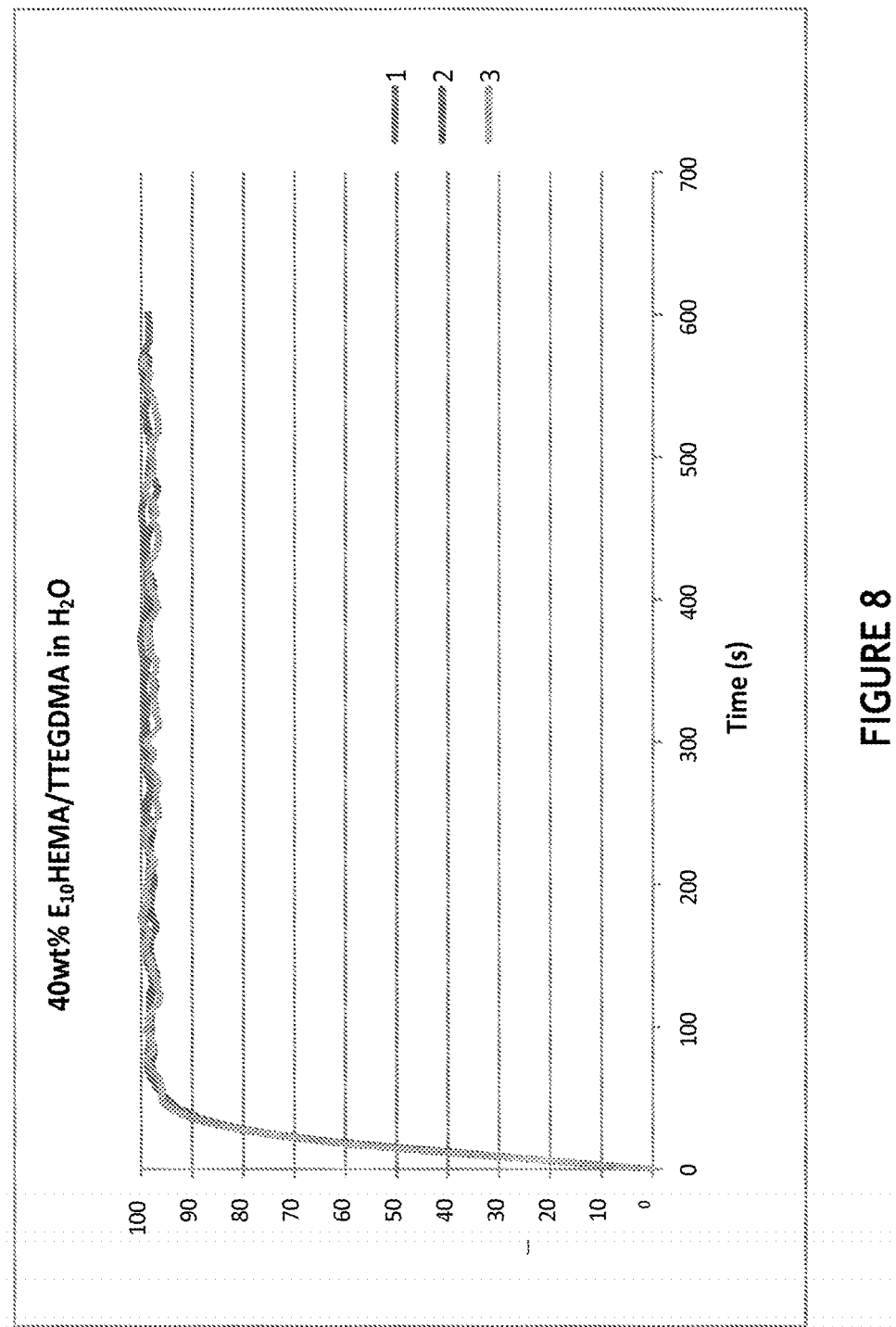

FIG. 8 illustrates photopolymerization kinetics of a water dispersed reactive nanogel prepared from tetraethylene glycol dimethacrylate and ethoxylated hydroxyethyl methacrylate.

Figure 9:
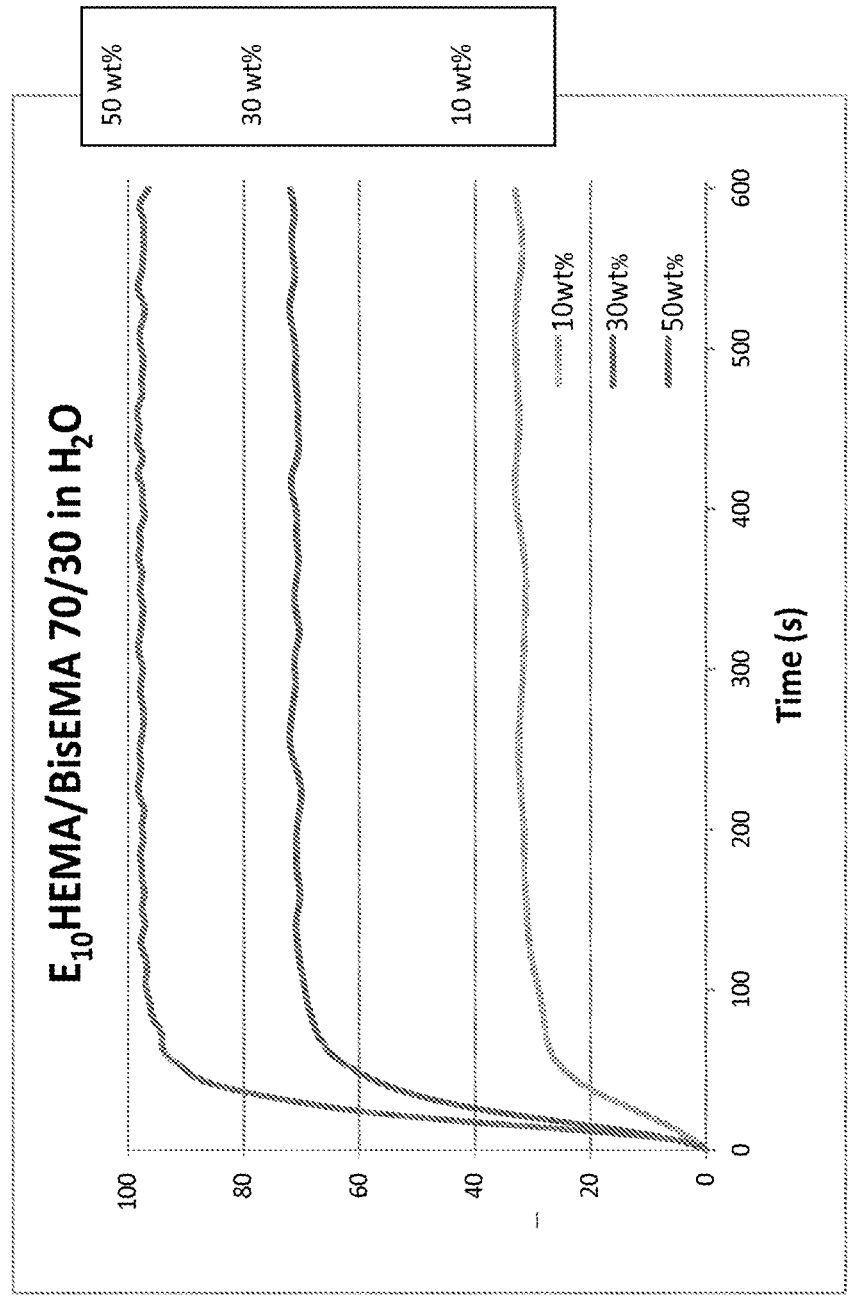

FIG. 9 illustrates concentration dependent reactive nanogel polymerization in water. Nanogel=$E_{10}$HEMA/BisEMA 70/30 mol %, 15 mol % mercaptoethanol prepared in 4:1MEK, with 1 wt % AIBN, 15 mol % IEM. Nanogel added to water with 0.1 wt % HHMP (Irgacure 2959).

Figure 10:
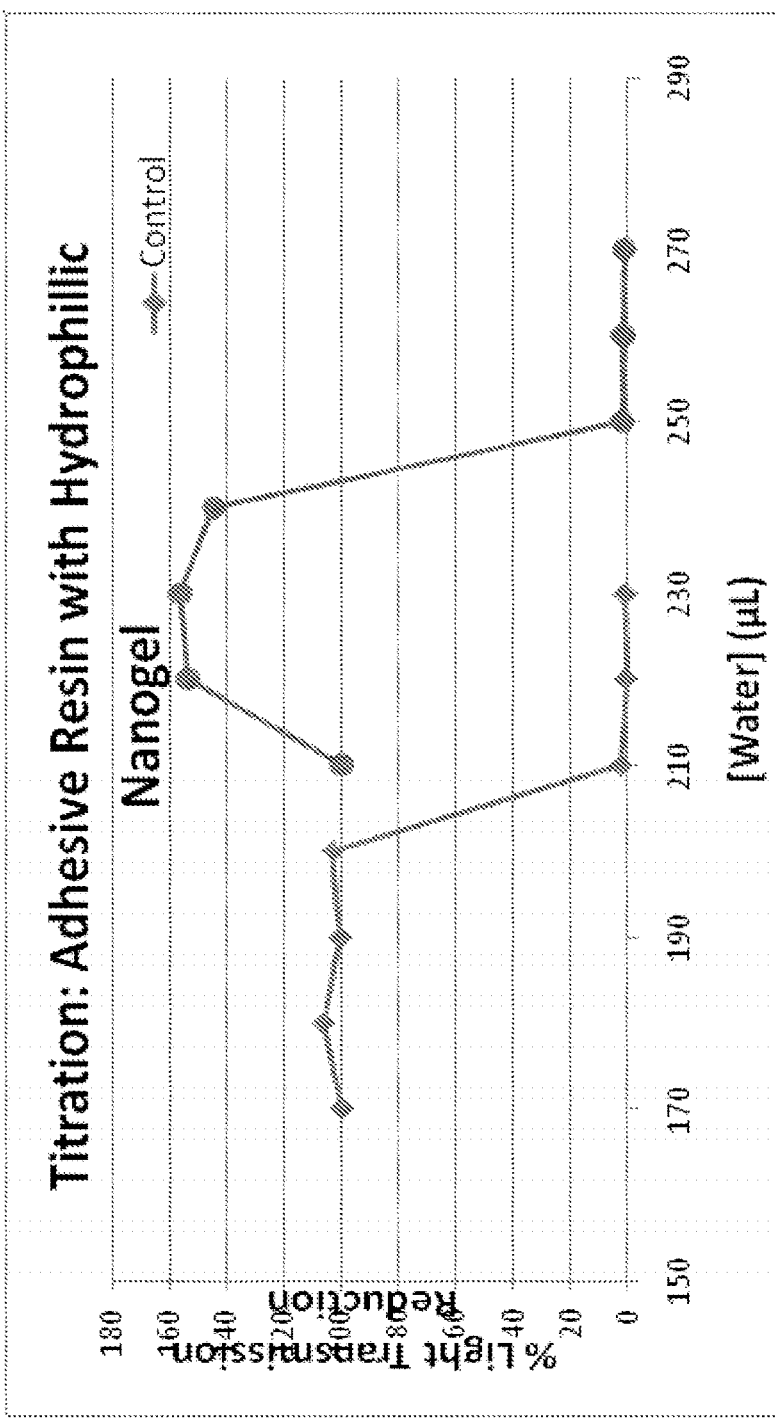

FIG. 10 illustrates relative visible light transmission of a BisGMA/HEMA (60:40 mole ratio) model adhesive resin and the nanogel-modified with progressive addition of water. The water-induced phase separation is evidenced by a drop in optical transmission. In the presence of the nanogel (20 wt % of BisEMA/$E_{10}$HEMA), higher water concentration is tolerated prior to the onset of thermodynamic instability. The initial increase in relative light transmission for the experimental resin may indicate enhanced nanogel dispersion in the presence of water.

Figure 11:
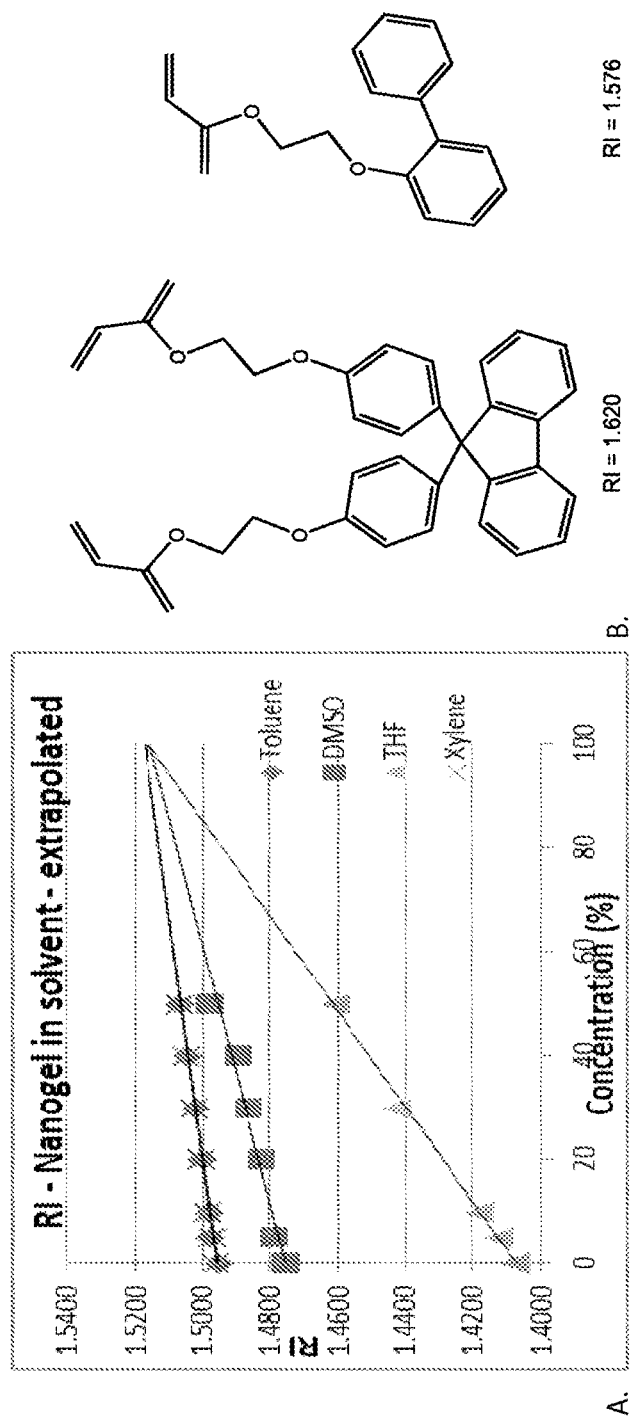

FIG. 11 illustrates refractive index (left; at 23° C.) of varied mass fractions of nanogel {IBMA/UDMA (80:20) with 15 mol % mercaptoethanol and IEM} dispersed in toluene, dimethyl sulfoxide (DMSO), tetrahydrofuran (THF), or xylene. Also show (right), structures of the high refractive index monomers used to prepare nanogels.

Figure 12:
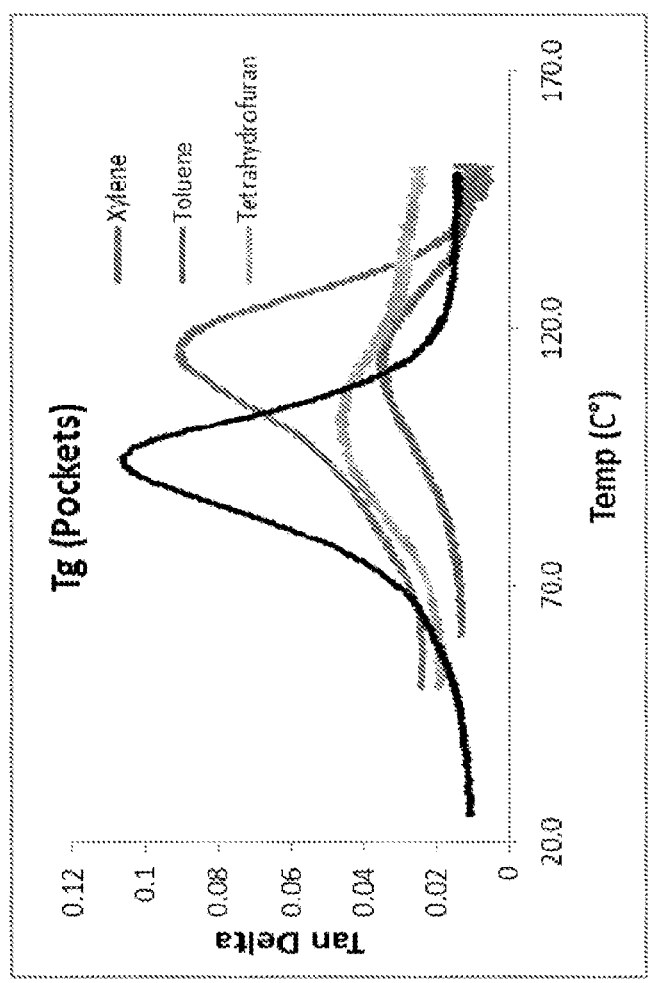

FIG. 12 illustrates DMA characterization of an IBMA/UDMA 80/20, 15ME/IEM nanogel in bulk form and the macrogel polymer obtained after polymerizing 50 wt % dispersions of the reactive nanogel in various solvents—solvent removed under vacuum. Black line=bulk nanogel. The Tg of bulk reactive nanogel was 94.6° C.; in 50 wt % xylene 114.7° C.; in 50 wt % toluene 113.0° C.; in 50 wt % tetrahydrofuran 102.1° C.

Figure 13:
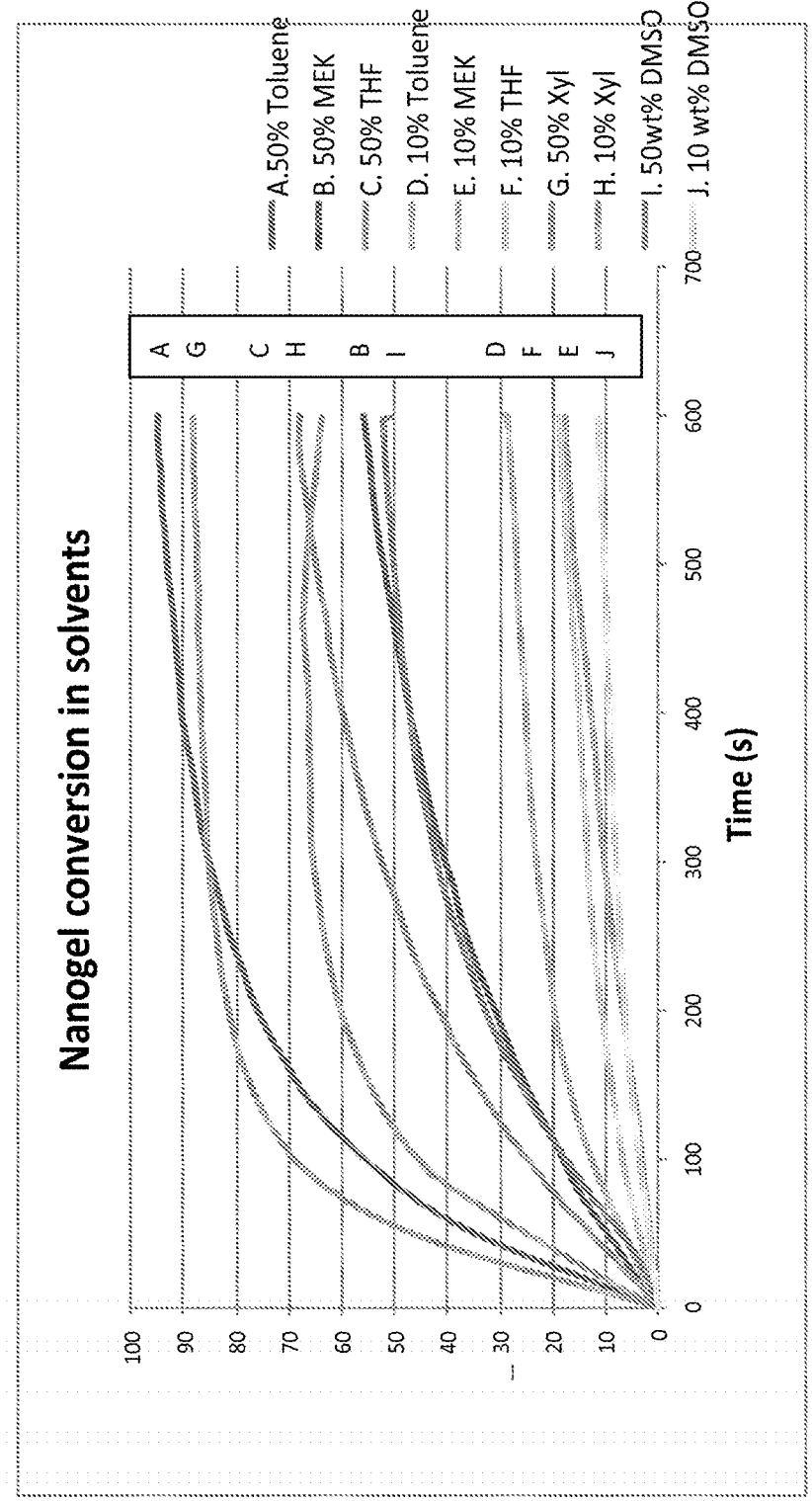

FIG. 13 illustrates photopolymerization reaction kinetics (600 s of 365 nm UV light at 70 mW/cm$^2$) involving 10 or 50 wt % nanogel (IBMA/UDMA 80:20 with 15 mol % ME/IEM) dispersed in various solvents containing 0.1 wt % DMPA.

Figure 14:
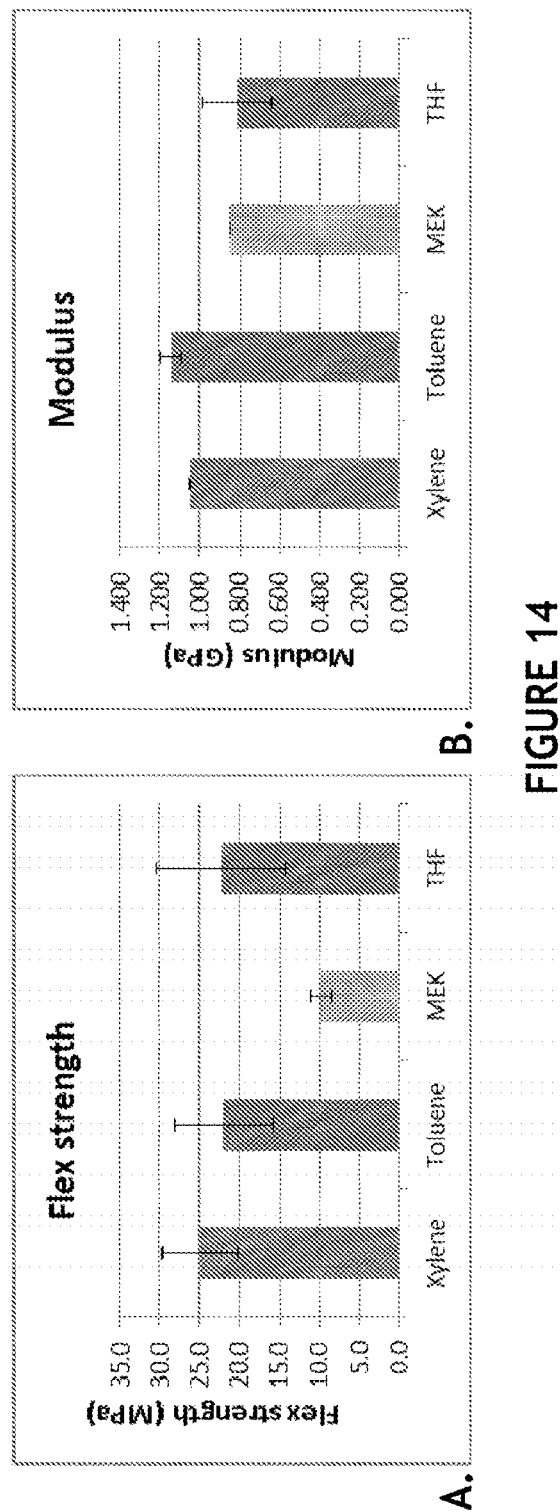

FIG. 14 illustrates mechanical properties flexural strength and flexural modulus for Nanogel—IBMA/UDMA 80/20, 15ME; 50 wt % in solvent; 0.1 wt % DMPA; polymerized using Acticure, 365 nm filter, 5 min per side; 2×5×20mm bars, desiccated for 48 h+ prior to testing in three-point bending.

Figure 15:
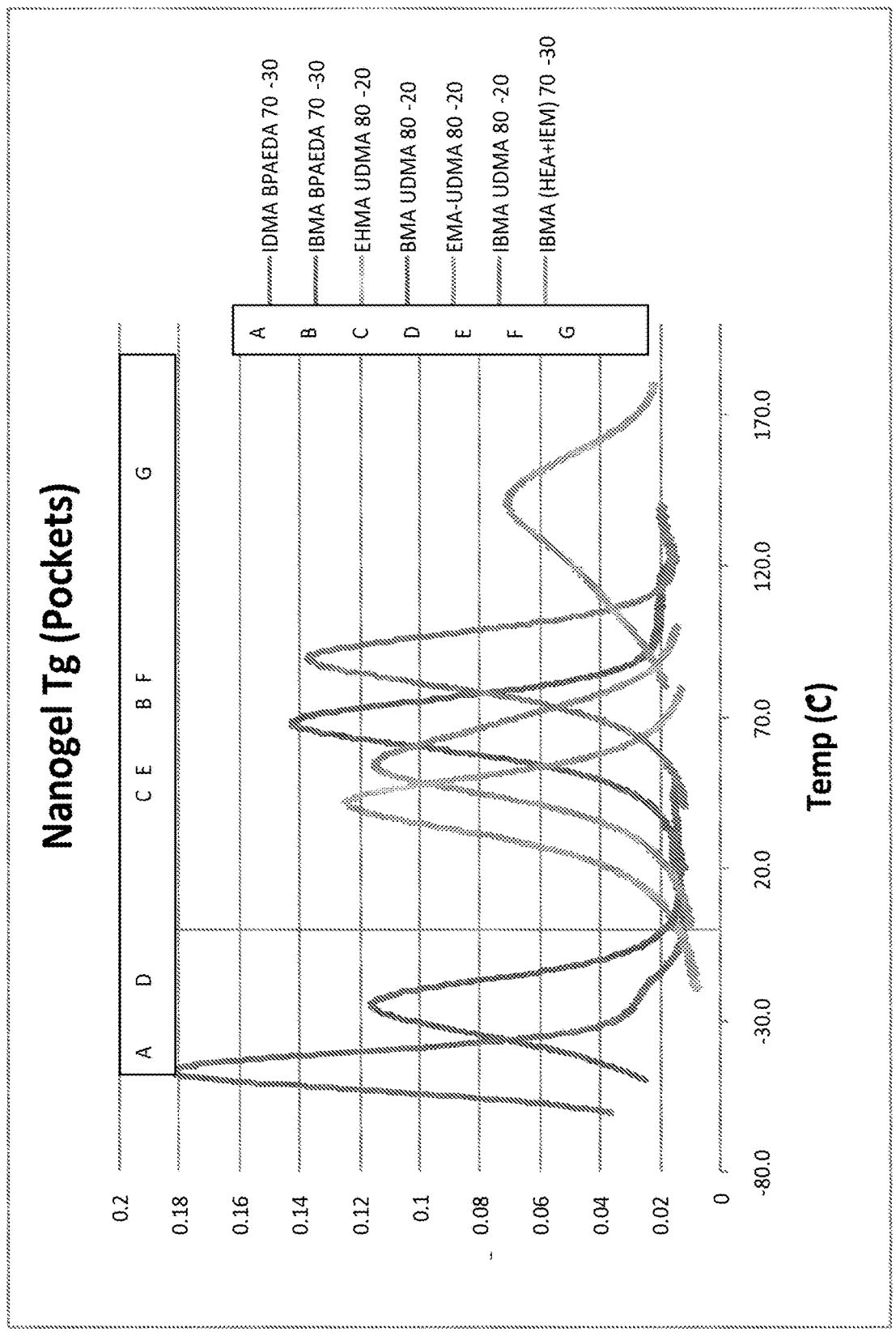

FIG. 15 illustrates DMA-based measurement obtained by placing ~10 mg of bulk nanogel between thin metallic strips and put under cyclic load (5% strain, 1 Hz) as the temperature was ramped at 3° C./min. The monomers used in the nanogels are isodecyl methacrylate (IDMA), ethoxylated bisphenol A diacrylate (BPAEDA), isobornyl methacrylate (IBMA), 2-ethylhexyl methacrylate (EHMA), urethane dimethacrylate (UDMA), butyl methacrylate (BMA), ethyl methacrylate (EMA), hybrid acrylate/methacrylate prepared by the reaction of hydroxyethyl acrylate and isocyanatoethyl methacrylate (HEA+IEM). The latter produced an unexpectedly high Tg nanogel.

Figure 16:
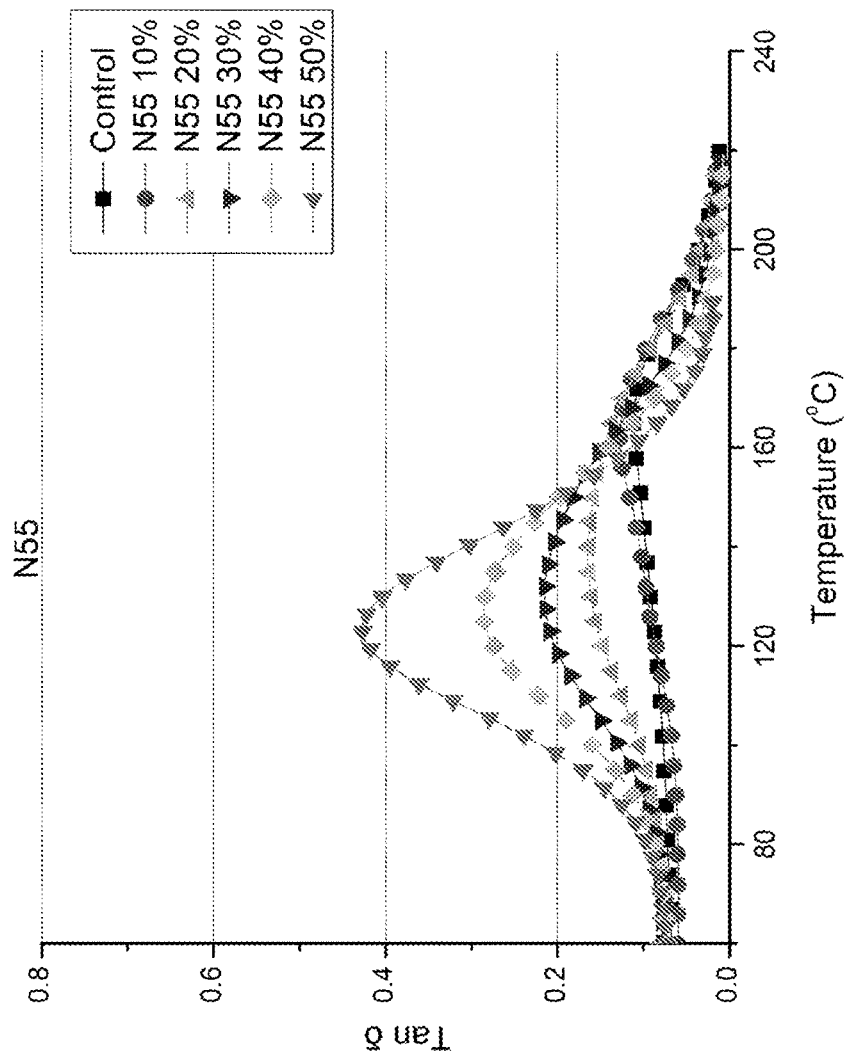

FIG. 16 illustrates DMA measurement of tan delta for polymers formed from triethylene glycol dimethacrylate containing varied concentrations of a reactive nanogel prepared from IBMA/UDMA (50:50 mole ratio) with mercaptoethanol. The temperature was ramped from 0° C. to 220° C. with f=1 Hz and scan rate of 2° C./min. Samples were preheated to 160° C. for overnight to prevent continued thermal polymerization during the DMA testing.

Figure 17:
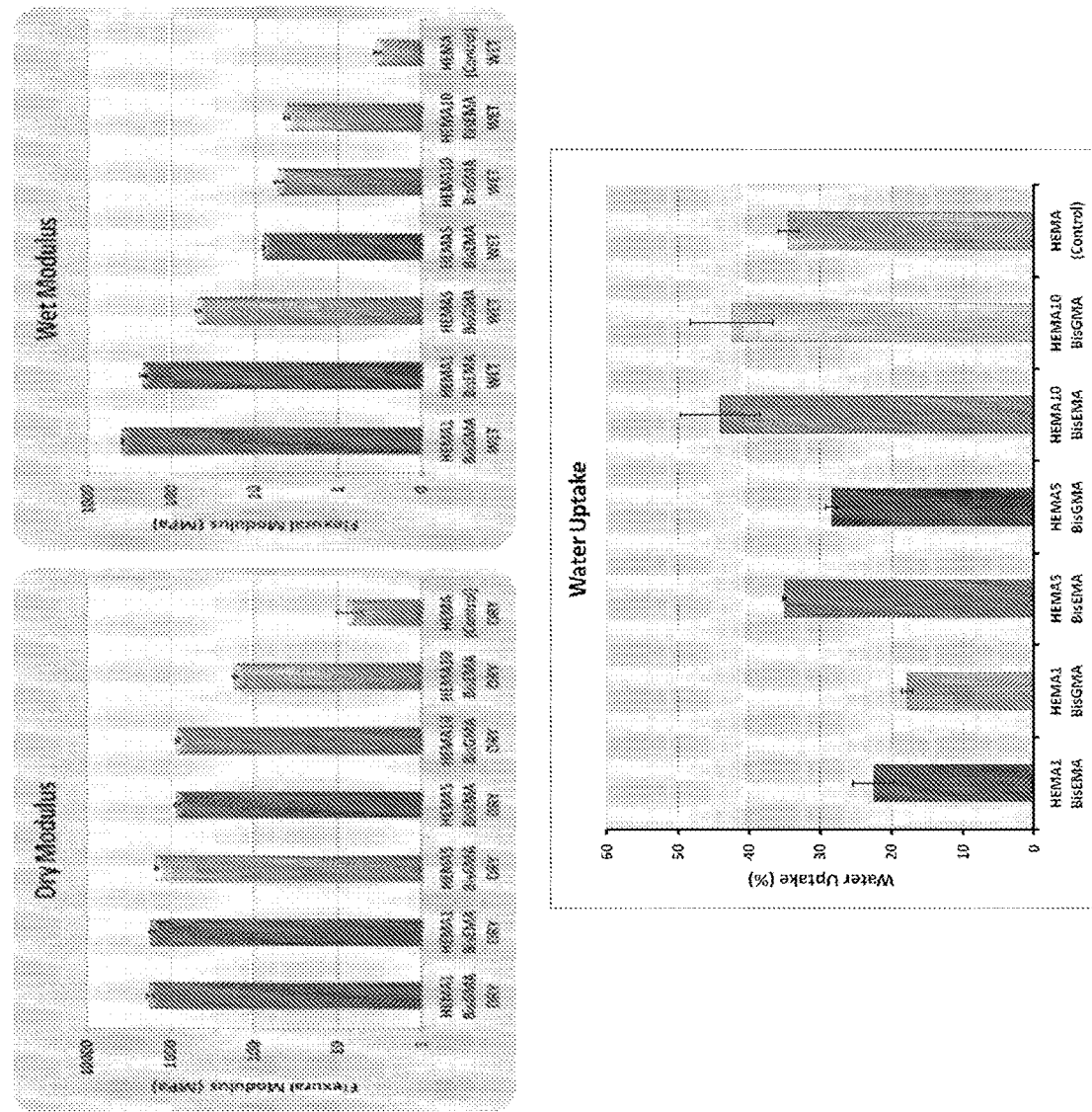

FIG. 17 illustrates flexural modulus in the dry and wet states for polymers prepared from HEMA or 50 wt % nanogel-modified HEMA compositions. The weight percent of equilibrium water uptake of these same materials shows some nanogels raise the overall hydrophilicity while others can produce significantly more hydrophobic materials.

DETAILED DESCRIPTION OF THE PREFERRED EMBODIMENT

The disclosure provides methods to achieve water dispersible or water compatible nanogels that can be used as reactive additives in monomer and resin systems or as 3D macrogel polymer precursors in monomer-free water-based applications. Various embodiments provide demonstration of broader use of solvent (organic or aqueous/organic mixtures) dispersed nanogels. Other embodiments provide nanogels for use as refractive index and Tg modifiers of secondary polymeric materials. Still other embodiments provide non-acrylic nanogel construction to provide enhanced esterase and hydrolytic resistance. In one embodiment, the disclosure provides nanogels that provide or promote polymers with high wet strength and durability. In one aspect, a UDMA/MAA nanogel is provided for use at high wet strength applications. Potential applications for the nanogels of the disclosure include dental adhesives, sealants and varnishes; bone cements, adhesives and other in situ-formed biomedical devices; waterborne UV-curable coatings; modifiers for existing UV-curable coatings used in microelectronics, displays, solar panels, etc.

Traditionally, the term "nanogel" means a polymer gel particle having any shape with an equivalent diameter of approximately a few to 100 nm. "Nanogel" describes the interconnected localized network structures as well as appropriately describing the physical dimensions of the polymer gel particle. Nanogels are typically soluble in the solvent in which they are made and nanogels may be further made to be soluble in various liquids as necessary depending on the monomers used in their manufacture. However, nanogels can also be prepared in the absence of solvent (in bulk) and subsequently dissolved in an appropriate solvent or monomer composition.

As used herein, the term "nanogel", that is a soluble polymer particulate (or perhaps more accurately described as forming a stable, colloidal-like dispersion), is defined as a soluble, porous polymer gel particle having any shape with an equivalent diameter of about 1 to 200 nm, or greater, so long as the particle remains soluble in a target solvent or a monomer composition with which the nanogel is intended to be used. A nanogel is soluble in that it is uniformly dispersible as single discrete macromolecular structures in water, an aqueous solution, the target solvent or a monomer composition. In one aspect, the nanogel of the present invention has an equivalent diameter of about 1 nm to about 100 nm, about 5 nm to about 80 nm, about 7 nm to about 60 nm, about 10 nm to about 50 nm, about 15 nm to about 45 nm, about 20 to about 30 nm; about 5 nm to about 20 nm; or about 5 nm to about 15 nm. In another aspect, the diameter of the nanogel is such that it can be visualized by atomic force microscopy or by light scattering.

The term "microgel" was developed initially to describe the precursor micro-structures that eventually connect to create the infinite crosslinked polymeric networks referred to here as macrogel ("macrogel"). A "microgel" is an insoluble polymer gel microparticle having any shape with an equivalent diameter of approximately 0.1 to 100 µm. A polymer gel particle is a particle composed of a polymer gel and having any shape. A polymer gel is a gel based on a chemically or physically interconnected polymer network.

A "polymer" is a substance composed of macromolecules. A polymer macromolecule is a molecule of high relative molecular mass, the structure of which comprises the multiple repetition of units derived from molecules of low relative molecular mass.

A "branched polymer" is a polymer that includes side chains of repeat units connecting onto the main chain of repeat units (different from side chains already present in the monomers). A branched polymer refers to a non-linear polymer structure, but typically, not a network structure. Therefore, a trace forward from the branch point would not bridge back to the original main chain; i.e. minimal to no backbone crosslinking is present. A branched polymer would generally be soluble in an appropriate solvent.

A "crosslinked polymer" is a polymer that includes interconnections between chains, either formed during polymerization (by choice of monomer) or after polymerization (by addition of a specific reagent). In a crosslinked polymer network, with the crosslinks serving as branch points, it is possible to trace a continuous loop back to the backbone. The crosslinked network would be insoluble in all solvents.

A "network polymer" is a crosslinked polymer that includes two or more connections, on average, between chains such that the entire sample is, or could be, a single molecule. Limited crosslink connections per chain would be considered lightly crosslinked while numerous crosslinks would be considered highly (or heavily) crosslinked.

A "copolymer" is a material created by polymerizing a mixture of two, or more, starting compounds. The resultant polymer molecules contain the monomers in a proportion which is related both to the mole fraction of the monomers in the starting mixture and to the reaction mechanism.

A "chain transfer agent" is an intentionally added compound that terminates the growth of one polymer chain and then reinitiates polymerization to create a new chain. A chain transfer agent is used as a way to limit chain length.

In one aspect, the chain transfer agent is selected from among alkyl thiols, aryl thiols, monovinyl thiols, divinyl thiols, difunctional thiols, trifunctional thiols, tetrafunctional thiols, pentafunctional thiols, hexafunctional thiols, octafunctional thiols, and bis(borondifluorodimethylglyoximate) cobaltate (H). In a certain aspect, the chain transfer agent is selected from propyl mercaptan, butyl mercaptan, hexyl mercaptan, octyl mercaptan, dodecanethiol, thioglycolic acid, methylbenzenethiol, dodecanethiol, mercaptopropionic acid, 2-ethyl hexyl thioglycolate, octylthioglycolate, mercaptoethanol, mercaptoundecanoic acid, thiolactic acid, thiobutyric acid, trimethylol propane tris(3-mercaptopropionate), pentaerythritol tetra(3-mercaptopropionate), pentaerythritol tetrathioglycolate, pentaerythritol tetrathiolactate, pentaerythritol tetrathiobutyrate; dipentaerythritol hexa(3-mercaptopropionate), dipentaerythritol hexathioglycolate; tripentaerythritol octa(3-mercaptopropionate), tripentaerythritol octathioglycolate and cysteine. In a specific aspect, the chain transfer agent is selected from 1-dodecanethiol and mercaptoethanol (ME).

In a preferred aspect, the chain transfer agent is a difunctional chain transfer agent is selected from mercaptoethanol, mercaptopropanol, 3-mercapto-2-butanol, 2-mercapto-3-butanol, 3-mercapto-2-methyl-butan-1-ol, 3-mercapto-3-methyl-hexan-1-ol, 3-mercaptohexanol and 3-mercaptopropionic acid.

In one aspect, nanogels are prepared with mercaptoethanol (15 mol %) as chain transfer agent.

Alternative chain transfer agents may be any species known to reduce molecular weight in the conventional free-radical polymerization of vinyl monomers. Examples include sulphides, disulphides, and halogen-containing species. Also, catalytic chain transfer agents such as cobalt complexes, e.g. cobalt (II) chelates such as cobalt porphyrin compounds are useful chain transfer agents for the invention. Suitable cobalt chelates are known in the art and are described in WO 98/04603. A particularly suitable compound is bis(borondifluorodimethylglyoximate) cobaltate (II) also known as CoBF. Catalytic chain transfer agents may be used in relatively low concentrations compared to conventional thiol chain transfer agents, e.g. <0.5% preferably <0.1% by weight (on monovinyl monomer), since they are generally highly effective at low concentrations.

The polymerization of the monomers may be initiated by any suitable method of generating free-radicals such as by thermally induced decomposition of a thermal initiator such as an azo compound, peroxide or peroxyester. Alternatively, redox initiation or photo-initiation can be used to generate the reactive free radicals. Therefore the polymerization mixture also preferably contains a polymerization initiator which may be any of those known and conventionally used in free-radical polymerization reactions, e.g. azo initiators such as azobis(isobutyronitrile) (AIBN), azobis(2-methylbutyronitrile), azobis(2,4-dimethylvaleronitrile), azobis(4-cyanovaleric acid), peroxides such as dilauroyl peroxide, tert-butyl peroxyneodecanoate, dibenzoyl peroxide, cumyl peroxide, tert-butyl peroxy-2-ethyl hexanoate, tert-butyl peroxy diethyl acetate and tert-butyl peroxy benzoate. In a specific aspect, the thermal initiator is AIBN.

In another aspect, the initiator is a redox (reduction-oxidation) pair of initiators. Redox initiator systems use both a primary initiator and a chemical reducing agent. Several types of redox initiator pairs are known such as persulfite-bisulfite, persulfate-thiosulfate, persulfate-formaldehyde sulfoxylate, peroxide-formaldehyde sulfoxylate, peroxide-metallic ion (reduced), persulfate-metallic ion (reduced), benzoyl peroxide-benzene phosphinic acid, and benzoyl peroxide-amine wherein the amine acts as the reducing agent. The redox pair may be selected from any known redox pair such as a combination of benzoyl peroxide and dimethyl-p-toluidine, AMPS (ammonium persulfate) and TEMED (tetramethyl ethylene diamine), sulfur dioxide and ter-butyl hydroperoxide, potassium persulfate and acetone sodium bisulfite. In a specific aspect, the redox initiator pair is 1 wt % benzoyl peroxide with 1.5 wt % dimethyl-p-toluidine amine coinitiator.

In a one aspect, the initiator is a photoinitiator. The photoinitiator can be selected from one or more known photoinitiators. For example, the initiator can be selected from one or more of an alpha-hydroxyketone, an acyl phosphine oxide, a benzoyl peroxide with or without an amine co-initiator. Any known photoinitiator, or combination of one or more photoinitiators can be employed. For example, the photoinitiator can be selected from one or more acyl phosphine oxides such as BAPO (bis-acylphosphine oxide), phenyl-bis(2,4,6-trimethylbenzoyl)phosphine oxide, TPO (2,4,6-trimethylbenzolyldiphenylphosphine oxide), bis-trimethoxybenzoyl-phenylphosphine oxide, TPO-L (2,4, 6-trimethylbenzoylphenyl phosphinate), or MAPO (tris[1-(2-methyl)aziridinyl]phosphine oxide. Other photoinitiators may be employed alone or in combination including, but not limited to, DMPA (2,2-dimethoxy-2-phenylacetophenone), BDK (benzil dimethylketal), CPK (cyclohexylphenylketone), HDMAP (2-hydroxy-2-methyl-1-phenyl propanone), ITX (isopropylthioxanthrone), HMPP (hydroxyethyl-substituted alpha-hydroxyketone), MMMP (2-methyl-4'-(methylthio)-2-morpholinopropiophenone), BDMB (2-benzil-2-dimethylamino-1-(4-morpholinophenyl)-butanone-1), BP (Benzophenone), TPMK (methylthiophenyl-morpholinoketone), 4-Methylbenzophenone, 2-Methylbenzophenone, 1-Hydroxy cyclohexyl phenyl ketone, 2-Benzyl-2-(dimethylamino)-1-[4-(4-morpholinyl)phenyl]-1-butanone, Diphenyl Iodonium Hexafluorophosphate, Bis (p-tolyl) iodonium hexafluorophosphate, 2-Methyl-1-[4-(methylthio)phenyl]-2-morpholinopropanone-1, 2-Hydroxy-2-methyl-phenyl-propan-1-one, 1,7-bis(9-acridinyl)heptane, 2-Hydroxy-4'-hydroxyethoxy-2-methylpropiophenone, 2,2'-Bis(O-chlorophenyl-4,4',5,'-tetraphenyl-1, 2'-diimidazole, 9-Phenylacridine, N-phenylglycine, 2-(4-methoxyphenyl-4, 6-bis (trichloromethyl)-1,3,5-triazine, P-toluene sulfonylamine, Tris-(4-dimethylaminophenyl) methane, Tribromo methyl phenyl sulfone, 2,4-Bis (trichloromethyl)-6-(p-methoxy)styryl-s-triazine, 2,4-Bis(trichloromethyl)-6-(3, 4-dimethoxy) styryl-s-triazine, 4-(2-aminoethoxy)methyl benzophenone, 4-(2-hydroxyethoxy) methyl benzophenone, 2-Isopropylthioxanthone, 4-Isopropylthioxanthone, 4-Hydroxy benzophenone, 4-Methyl acetophenone, 4-(4-Methylphenylthiophenyl)-phenylmethanone, dimethoxyphenylacetophenone, camphorquinone, 1-Chloro-4-propoxythioxanthone , 2-Chlorothioxanthone, 2, 2-Diethoxyacetophenone, 2,4-Diethylthioxanthone, 2-Dimethyl-aminoethylbenzoate, 2-Ethylhexyl-4-dimethylaminobenzoate, Ethyl-4-(dimethylamino) benzoate, 2-Isopropylthioxanthone, Methyl o-benzoyl benzoate, Methyl phenyl glyoxylate, 4,4'Bis (diethylamino) benzophenone, 4-Phenylbenzophenone, 2,4,6- and Ethyl (2,4, 6-trimethylbenzoyl) phenylphosphinate.

The polymerization photoinitiators are used in amounts effective to initiate polymerization in the presence of the curing radiation, typically about 0.01 to about 10 wt %, and more specifically about 0.05 to about 7 wt %, and more specifically, about 0.1 to about 5 wt %, based on the total weight of the composition.

The photoinitiator composition can optionally further contain a coinitiator for example, EHA (2-ethyl hexylacrylate) or an amine coinitiator such as, for example, ethyl-4-(dimethylamino)benzoate, 2- ethylhexyl dimethylaminobenzoate, dimethylaminoethyl (meth)acrylate, or the like. Reactive amine polymerization coinitiators can be used, such as the coinitiator CN386 (a reactive amine adduct of tripropylene glycol diacrylate), commercially available from Sartomer, Darocure EHA , or commercially available from Ciba, and the like. The coinitiator can be present in the composition in an amount of about 0.25 to about 20 wt %, specifically about 1 to about 10 wt %, and more specifically about 1 to about 5 wt %, based on the total weight of the composition. In a specific aspect the initiator is BAPO bis-acyl phosphine oxide commercially available, for example, as Irgacure from Ciba.

"Gelation time" is the time to reach the gel point (the point at which a continuous crosslinked network initially develops) during a polymerization.

A "filler" is a solid extender which may be added to a polymer to modify mechanical, optical, electrical, thermal, flammable properties, or simply to act as an extender. The filler can be reactive or inert in the polymerization.

An "extender" is a substance added to a polymer to increase its volume without substantially altering the desirable properties of the polymer.

The term "inert matrix" comprises, for example, water, an inert solvent, or a combination of water and an inert solvent.

The term "alkyl", "aliphatic" or "aliphatic group" as used herein means a straight-chain or branched $C_{1-20}$ hydrocarbon chain that is completely saturated or that contains one or more units of unsaturation, or a monocyclic $C_{3-8}$ hydrocarbon or bicyclic $C_{8-12}$ hydrocarbon that is completely saturated or that contains one or more units of unsaturation, but which is not aromatic (also referred to herein as "carbocycle" or "cycloalkyl"), that has a single point of attachment to the rest of the molecule wherein any individual ring in said bicyclic ring system has 3-7 members. For example, suitable alkyl groups include, but are not limited to, linear or branched or alkyl, alkenyl, alkynyl groups and hybrids thereof such as (cycloalkyl)alkyl, (cycloalkenyl)alkyl or (cycloalkyl)alkenyl.

The terms "alkoxy," "hydroxyalkyl," "alkoxyalkyl" and "alkoxycarbonyl," used alone or as part of a larger moiety include both straight and branched chains containing one to twelve carbon atoms. The terms "alkenyl" and "alkynyl" used alone or as part of a larger moiety shall include both straight and branched chains containing two to twelve carbon atoms.

The term "heteroatom" means nitrogen, oxygen, or sulfur and includes any oxidized form of nitrogen and sulfur, and the quaternized form of any basic nitrogen.

The term "aryl" used alone or in combination with other terms, refers to monocyclic, bicyclic or tricyclic carbocyclic ring systems having a total of five to fourteen ring members, wherein at least one ring in the system is aromatic and wherein each ring in the system contains 3 to 8 ring members. The term "aryl" may be used interchangeably with the term "aryl ring". The term "aralkyl" refers to an alkyl group substituted by an aryl. The term "aralkoxy" refers to an alkoxy group substituted by an aryl.

A vinyl, or "-ene," functional group suitable for embodiments of the present invention includes any monomer having one or more vinyl functional groups, i.e., reacting "—C═C—" groups. Synonyms for a vinyl functional group include the terms olefinic group, alkenyl group, and ethylenic group.

As used herein, a "monovinyl monomer" is a monomer having one polymerizable double bond per molecule. The monovinyl monomer may comprise any monomer which can be polymerized by a free-radical mechanism such as (meth)acrylates and acrylates, styrene and derivatives thereof (styrenics), vinyl acetate, maleic anhydride, itaconic acid, N-alkyl (aryl) maleimides and N-vinyl pyrrolidone, vinyl pyridine, acrylamide, methacrylamide, N,N-dialkyl-methacrylamides and acrylonitrile. Vinyl monomers, such as styrenics, acrylates and (meth)acrylates, (meth)acrylamides and acrylonitrile are preferred monomers. Mixtures of more than one monovinyl monomer may be used.

Examples of suitable acrylate monomers include alkyl acrylates such as methyl acrylate and ethylacrylate (EA). Examples of suitable monovinyl (meth)acrylate monomers include $C_1$-$C_{20}$ alkyl(meth)acrylates, preferably $C_1$-$C_8$, and more preferably $C_1$-$C_4$, such as, for example, methyl(meth) acrylate, ethyl(meth)acrylate (EMA), propyl(meth)acrylate, n-butyl(meth)acrylate, iso-butyl(meth)acrylate, t-butyl (meth)acrylate, 2-ethylhexyl(meth)acrylate octyl (meth) acrylate, dodecyl(meth)acrylate, isodecyl methacrylate (IDMA), ethoxylated bisphenol A diacrylate (BPAEDA), isobornyl methacrylate (IBMA), 2-ethylhexyl methacrylate (EHMA), butyl methacrylate (BMA), and ethyl methacrylate (EMA), hybrid acrylate/methacrylate prepared by the reaction of hydroxyethyl acrylate and isocyanatoethyl methacrylate (HEA+IEM).

Examples also include (meth)acrylamide monovinyl monomers. Other suitable monovinyl monomers include aromatic (meth)acrylates. These include, but are not limited to, 2-phenoxyethyl (meth)acrylate, phenyl (meth)acrylate, p-t-butylphenyl (meth)acrylate, p-methoxyphenyl (meth) acrylate, p-tolyl (meth)acrylate, p-cyclohexylphenyl (meth) acrylate, p-nitophenyl (meth)acrylate, and benzoyl (meth) acrylate. Also suitable are polycyclicaromatic (meth) acrylates such as 2-napthyl (meth)acrylate. In addition, (meth)acrylic acid is a suitable monovinyl monomer.

As used herein, a "functional monomer" is a monomer having one or more additional reactive groups available for further polymerization or reaction of the nanogel particles. Such monomers include methacrylic acid and acrylic acid or other —COOH containing monomers (these embodiments are particularly suited for use with dental adhesives, sealants, and other dental materials); hydroxy alkyl acrylates such as hydroxy ethylacrylate (HEA); hydroxy alkyl (meth) acrylates such as hydroxyethyl(meth)acrylate (HEMA), polyethoxy ethyl methacrylate, hydroxypropyl(meth)acrylate and hydroxybutyl (meth)acrylate; oxirane containing (meth)acrylates (epoxy (meth)acrylates) such as glycidyl (meth)acrylate, and dialkyl aminoalkyl(meth)acrylates such as dimethylaminoethyl(meth)acrylate, diethylaminoethyl (meth)acrylate, dimethyl aminopropyl(meth)acrylate and diethylaminopropyl(meth)acrylate; and norbornyl (meth) acrylate.

In one aspect, water dispersible nanogels are prepared in a single stage by utilizing a hydrophilic monomer composition comprising a functional monomer that is selected from a poly(ethylene glycol) mono(meth)acrylate, polyethoxy ethyl methacrylate (EHEMA), and (meth)acrylamide.

In a particular aspect, the water dispersible nanogel is prepared in a single stage by employing 50 mol % to 90 mol % EHEMA compared to the mols of total monomer in the composition.

In one preferred aspect, polyethoxy (10) ethyl methacrylate (E10 HEMA, HEMA 10) is employed as a hydrophilic monomer.

As used herein, a reactive olefinic compound contains at least one olefinic group and at least one additional reactive functional group such as a halogen, isocyanato or anhydride group. Exemplary reactive olefinic compounds include, but are not limited to, (meth)acryloyl chloride, (meth)acrylic anhydride, (meth)acrylic acid, isocyanatoalkyl(meth)acrylate, isocyanatoethyl(meth)acrylate vinylbenzene chloride, chloroethyl vinyl ether, allyl chloride and isocyanatomethyl (meth)acrylate.

Unless otherwise specified or implied, the term "(meth) acrylate" includes both the (meth)acrylate ($CH_2$═$C(CH_3)C$ (=O)—), also known as methacrylate, and the analogous acrylate (CH$_2$=CHC(=O)—).

As used herein, a "divinyl monomer" is a monomer having two polymerizable double bonds per molecule. Examples of suitable divinyl monomers include: ethylene glycoldi(meth)acrylate, urethane dimethacrylate (UDMA), tetraethyleneglycoldi(meth)acrylate (TTEGDMA), the condensation product of bisphenol A and glycidyl (meth)acrylate, 2,2'-bis [4-(3-methacryloxy-2-hydroxy propoxy)-phenyl] propane (bis-GMA), ethoxylated bisphenol-A-di(meth) acrylate (BisEMA), hexanediol di(meth)acrylate, polyethyleneglycol dimethacrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, ally! (meth)acrylate, divinyl benzene, and 1,3-diglycerolatediacrylate and derivatives thereof. A bis (meth)acrylamide, such as N,N-methylene bisacrylamide, could also be used as the divinyl component. Optionally, the divinyl monomer may comprise a mixture of more than one divinyl compound.

In various embodiments, the nanogel synthesis involves radically induced (photo, thermal, redox and RAFT initiation approaches have been used) polymerizations of moderate to concentrated solutions of mono- and di-vinyl monomers, which have been drawn from (meth)acrylates (offering tremendous variety in available structures/properties).

In certain aspects, macrogelation is avoided by use of a chain transfer agent to controllably reduce polymer chain lengths, which in combination with the solvent, provides an effective means to produce discrete, high molecular weight nanogel structures.

In certain embodiments, nanogel synthesis is generally conducted to high conversion (≥85%) followed by mid- or near-IR (NIR) spectroscopy.

In aspects, isolation of the nanogel from any remaining starting materials is achieved by a simple, efficient precipitation.

Bulk nanogel is analyzed by solution-state NMR spectroscopy to determine composition and by gel permeation chromatography (GPC), which gives detailed information regarding particle structure and dimensions. Our laboratory uses triple detection (differential refractive index, viscosity, light scattering) GPC, which provides extensive polymer characterization information including: absolute molecular weight (critical for highly branched structures), polydispersity, branching density, hydrodynamic radius and intrinsic viscosity. Our GPC studies demonstrate that we can reproducibly prepare nanogels with molecular weights of $10^4$ to >$10^7$, polydispersities of about 2 to >10, and swollen particle sizes of 5 to 50 nm (from GPC based light scattering in THF).

In another embodiment, nanogels are readily re-dispersed to give optically clear, stable nanoparticle suspensions in appropriate solvents or liquid monomers, even viscous dental resins.

Figure 1:
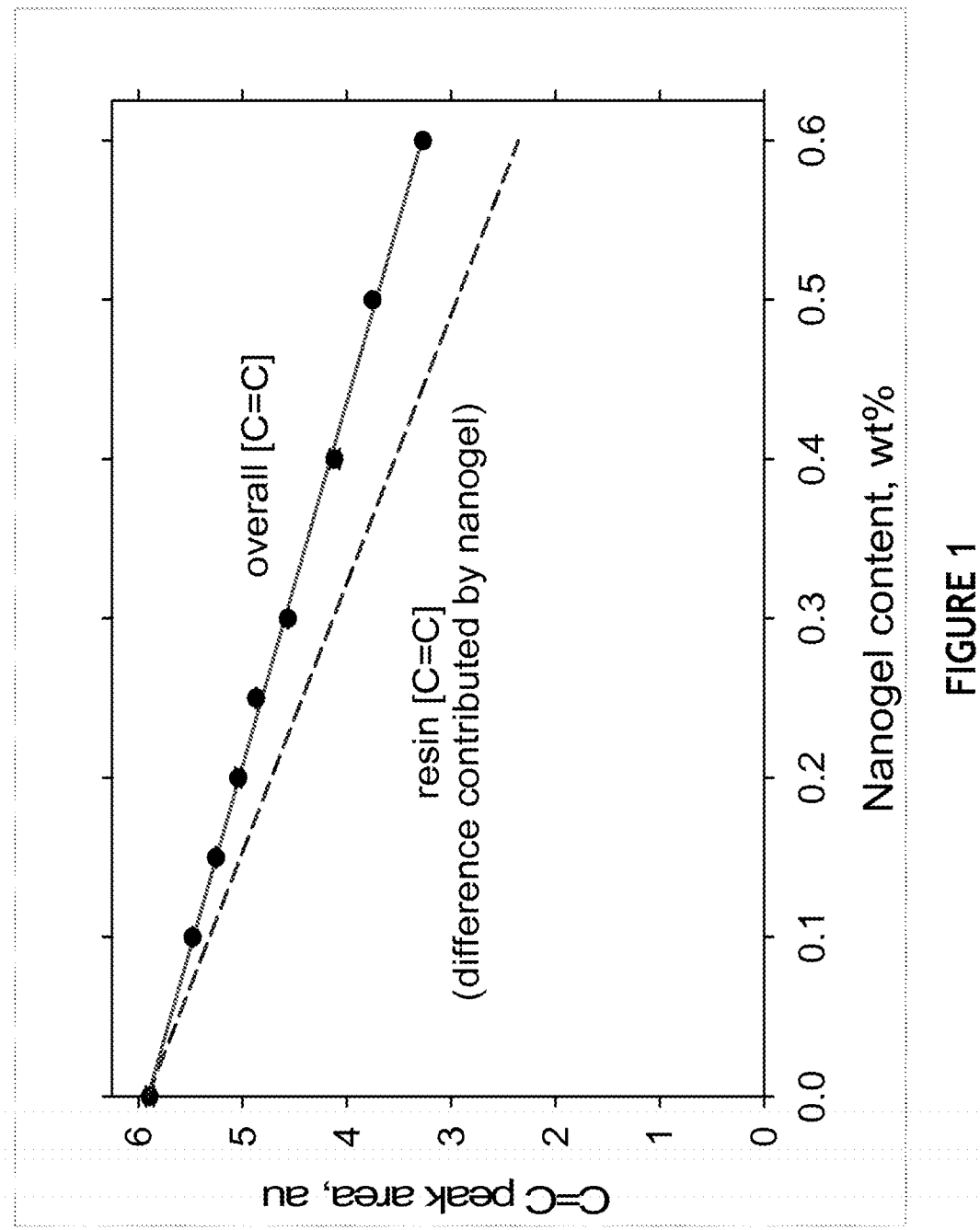
FIG. 1 illustrates (A) Near-IR area of C=C absorption (6165 cm-1) in arbitrary units for nanogel dispersed in TEGDMA. Linear regression (solid; $R^2$=0.998) fits measured methacrylate absorption and the calculated resin C=C concentration (dashed) with the difference between the lines provided by nanogel-based methacrylate groups.

In one aspect, the disclosure provides complete control over the concentration of reactive groups added and the distribution of reactive sites between the nanogel and any resin to which it is added based on the nanogel loading level used (FIG. 1).

In one embodiment, the unique nanogel materials are discrete nano-scale (10-50 nm) spherical or globular bundles of short polymer chains that are densely interconnected through covalent internal crosslinks and cycles. (Moraes, 2011a) Each particle represents a single macromolecule where a typical individual polymer chain within the nanogel may be based on the addition of only about 15-30 vinyl monomer units, but it may contain 10 or more branch points that lead to similar adjacent chains. Even with nanogel molecular weights over 10,000,000 Da, the particles can be stably dispersed in monomer to give clear colloidal suspensions. Since the nanogels are initially formed in solution, they can be re-swollen by monomer or solvent to contribute to or become the sole source of a polymer network. The bonding studies primarily used a fixed 25 wt % concentration of nanogel relative to the adhesive resin.

In one aspect, addition of a reactive nanogel to an adhesive resin improves the dry flexural strength and the wet flexural strength of the adhesive polymer resin. In an aspect, the reactive nanogel is added in about 10 wt % to about 80 wt %, compared to the weight of the adhesive resin to enhance dry and wet flexural strength of the adhesive polymer. In an aspect, the reactive nanogel is added in about 50 wt % to about 80 wt %, compared to the weight of the adhesive resin to enhance dry and wet flexural strength of the adhesive polymer. In a specific aspect, addition of about, 15 wt % to about 50 wt %, 15 wt % to about 35 wt %, about 20 wt % to about 30 wt % or about 25 wt % of reactive nanogel, compared to the weight of the adhesive resin, to the adhesive resin improves the dry and wet flexural strength of the adhesive resin polymer compared to a control resin without added reactive nanogel.

This level of nanogel loading was selected to give potential overlap of the reactive nanogel particles that could then link together to create a secondary reinforcing network that is interconnected with the BisGMA/HEMA-based network.

An important aspect of successful function of a dental composite, cemented crown or inlay is the adhesive used to bond the dental material to the tooth. Particularly in cases of dentin bonding, the choice of the bonding resin is critical. A large portion of the adhesives used in the placement of dental composite restoratives rely on relatively hydrophilic monomers dissolved in a volatile solvent such as acetone or ethanol. The hydrophilicity is necessary so the monomers can effectively penetrate into the acid-demineralized collagen network of etched dentin. A common example of a bonding resin composition consists of Bis-GMA, which provides moderate hydrophilic character but also mechanical strength and crosslinking, while 2-hydroxyethyl (meth) acrylate (HEMA) is included to provide substantial hydrophilicity to the overall resin. The HEMA as well as the water compatible solvent, carry the Bis-GMA into the collagen network. The majority of the solvent is then removed assisted by a gentle stream of air to thin the adhesive layer and accelerate evaporation. The single or multiple coatings of the adhesive are then typically photopolymerized prior to placement of the dental composite. The oxygen inhibited (meth)acrylate groups that remain unreacted after photocuring the adhesive, can then interact with the (meth)acrylate monomers introduced by the composite. When the composite is subsequently photopolymerized, the adhesive layer, which is predominantly physically interlocked with the dentin, copolymerizes with the composite resin to provide a strong attachment between the composite restorative and the tooth. However, due to its hydrophilic nature, the adhesive picks up significant amounts of water. This significantly weakens the polymer and reduces the bond strength. The adhesive layers often fail with water channels opening along this interfacial zone. As a means to overcome the degree of water uptake in the bonding resin and more importantly, to improve the long term integrity and strength of dental adhesives, we have proposed the use of nanogel additives that are hydrophobic, high modulus and reactive. Since the nanogel particle size is well below that of the dimensions of the interconnected collagen pore structure, the expectation is that nanogels can infiltrate the dentin along with the solvent and comonomers. When copolymerized with the conventional hydrophilic adhesive monomers, the nanogels can reduce the potential for water uptake and reinforce the polymer mechanical strength of the network especially in terms of the wet strength.

Figure 4:
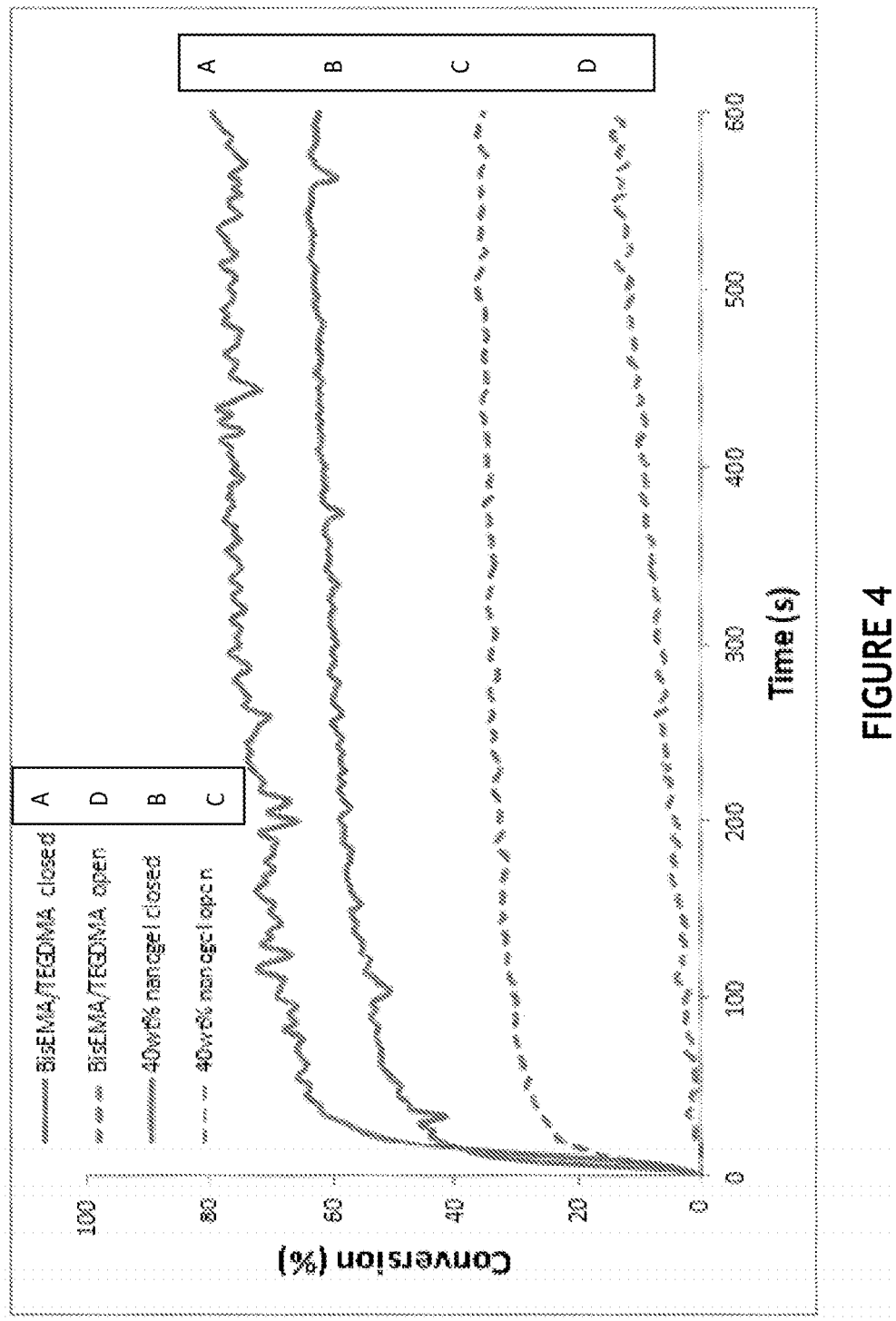
FIG. 4 illustrates conversion upon photopolymerization of BisEMA/TEGDMA (70:30 by mass) resin with 0.1 wt % DMPA photopolymerized (365 nm UV at 20 mW/cm2 for 300 s) as thin films* either laminated between NaCl plates (closed) or exposed to the air (open). The nanogel-modified material containing 40 wt % of a reactive nanogel (IBMA/UDMA 80:20 mole ratio) was polymerized in the same manner while real-time conversion was monitored by mid-IR.

In another embodiment, the disclosure provides new water compatible nanogel compositions to be added to BisGMA/HEMA or other adhesive monomer systems, as well as used alone to form polymer networks exclusively from reactive nanogels dispersed in water (or other inert solvents). Also included is work with functionalized bioactive nanogels that can further enhance the performance of the experimental adhesive materials. A notable advantage that advocates for the use of nanogels in moist dentin bonding applications is that monomeric components that individually are not water compatible (i.e. nanogels comprised of 30-50 mol % BisEMA, an extremely hydrophobic monomer) can be converted into a fully water compatible nanogel. Our preliminary work with both hydrophilic and amphiphilic nanogels that can be dispersed readily in water has shown that the incorporation of these nanogels (unlike the results obtained with hydrophobic nanogels) into a model adhesive resin significantly suppressed phase separation in BisGMA/HEMA/nanogel/water mixtures. As an added benefit, the addition of the instant water dispersible nanogels can decrease oxygen inhibition, as shown in FIG. 4 and described below.

In one aspect, surprisingly only 25 wt % of a moderately hydrophobic, reactive nanogel based on BisEMA and isobornyl methacrylate (IBMA) was found to increase dry flexural strength of a BisGMAIHEMA experimental adhesive from $33.8 \pm 1.3$ MPa to $44.9 \pm 2.6$ MPa. (Moraes, 2011b). However, the critically important result is that for the control, the fully water equilibrated wet adhesive strength dropped by half to $15.7 \pm 2.0$ MPa while wet strength of nanogel-modified adhesive was unchanged at $46.7 \pm 1.2$ MPa. Modulus was also unchanged between dry ($0.80 \pm 0.01$ GPa) and wet ($0.80 \pm 0.04$ GPa) conditions for the nanogel adhesive while the control decreased from $0.45 \pm 0.01$ GPa to $0.29 \pm 0.03$ GPa upon water storage. In micro-tensile dentin bond strength testing, the nanogel-modified adhesive produced strong durable bonds compared with the control. Effective infiltration of the nanogel into the demineralized dentin was verified by use of an analogous fluorescently tagged nanogel using confocal laser scanning microscopy. The nanogels used in that study were relatively hydrophobic and required use of a solvated (ethanol or acetone) adhesive. In spite of providing excellent dentin bonding results, the hydrophobic nanogels actually promoted phase separation in the adhesive at even lower water concentrations compared to the nanogel-free control resin.

Figure 2:
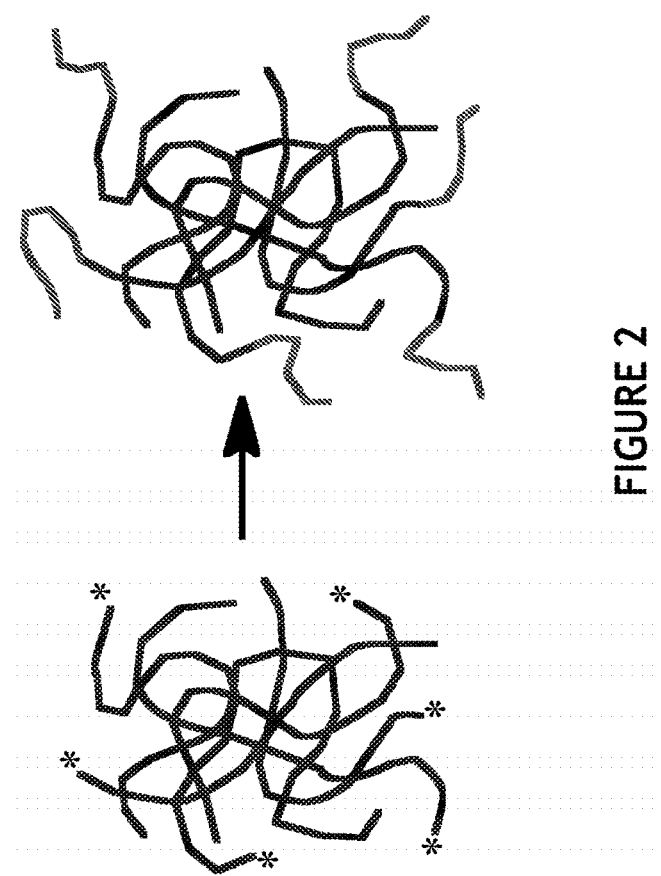
FIG. 2 illustrates nanogels prepared by RAFT-mediated radical polymerization do not require chain transfer agent since the monomer to initiator ratio controls average length of individual chains. The initial nanogel will be based on relatively hydrophobic monomer pairs (such as BisEMA/isobornyl methacrylate; shown in blue/black). The "living" chain ends (labeled *) can be extended by continued reaction with a hydrophilic monomer (such as EHEMA; shown in red/grey at right) to create an amphiphilic nanogel structure.

The ability to control molecular weight and polydispersity during nanogel synthesis is expected to greatly aid efforts towards maximizing practical nanogel loading limits in solvent and monomer since this provides better control of overall interfacial surface area and interparticle spacing. Each nanogel particle is composed of many (10's-100's) covalently interconnected chains and more uniform individual polymer chain lengths are expected to result in nanogels with correspondingly narrower ranges of molecular weight and particle size distribution. There is not necessarily a direct correlation between nanogel molecular weight and dimension since the internal branching density inversely influences the swollen diameter. In the case of nanogels for use in dental adhesives, molecular weight and polydispersity are related to the size and size distribution of the monomer- or solvent-swollen nanogel structures. For dental adhesive applications, nanogel components need to be of appropriate size to accommodate the spatial constraints of the demineralized collagen matrix. In one aspect, reversible-addition-fragmentation-transfer (RAFT) "living" radical polymerization mechanism is used to make very low polydispersity index nanogels (PDI=1.3). This aspect is exploited to control nanogel size and size distribution to fit the collagen interfibrillar spacing based on the solubility parameter of the specific nanogel-modified adhesive being used.(Pashley, 2007). The target dimensions of approximately 20-30 nm for the globular nanoparticle diameters necessary to span the gaps in the collagen matrix are well suited to the nanogel technology. Another potential advantage to narrower nanogel size distribution is that the viscosity at a given nanogel loading is reduced. Regarding the design of amphiphilic nanogels that permit water dispersion of relatively hydrophobic polymeric materials, RAFT polymerizations can be used to form relatively hydrophobic nanogel structures that will then be continued by the addition of more hydrophilic monomers to the "living" chain ends to yield unique copolymers (FIG. 2). Nanogels of this type could be considered "smart" materials where hydrophilic groups can either be retracted or extended depending on the local environment.

In another embodiment, solvent dispersed nanogels (water for purely hydrophilic nanogels and either water or ethanol, acetone, etc. including mixed solvents for amphiphilic nanogels) are used to demonstrate the potential network structure and properties contributed by specific nanogels polymerized as components of adhesive resins. By using inert solvents as the dispersion medium, we can probe how features like nanogel structure and Tg, reactive group concentration, solvent polarity, particle size and nanogel loading level influence ultimate network structure and properties. Critical levels of nanogel loading needed to achieve effective nanogel coalescence and extended 3D network structure have been demonstrated. The same nanogel has been shown to give very different polymer structure as various control parameters are systematically varied. Together the physical analyses of nanogel-based polymers formed in solvent (reaction kinetics, gel fractions, SEM of gels, DMA determination of crosslink densities) and rheologic data can identify nanogel percolation threshold and dense packing limit.

Figure 3:
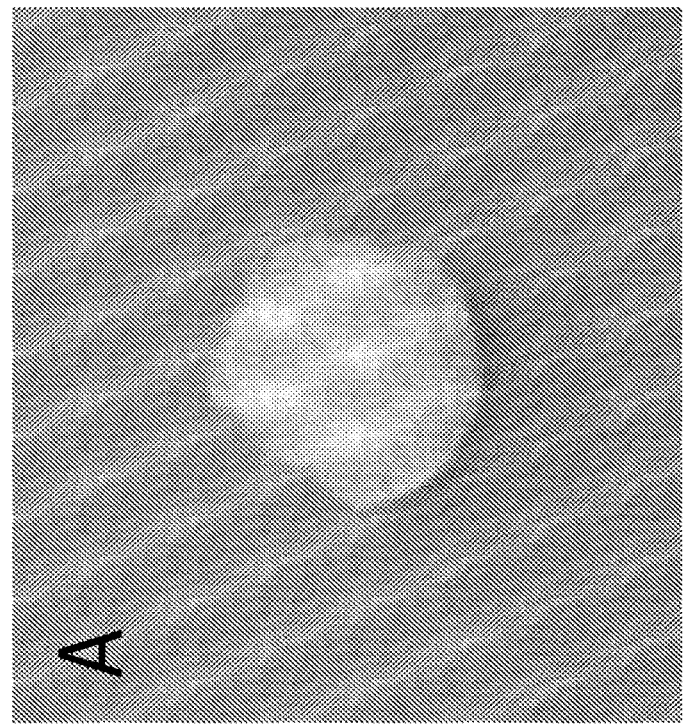
FIG. 3 illustrates network density differences (after solvent removal) from photocured toluene solutions of 40 wt % (A) or 50 wt % (B) nanogel (IBMA/UDMA). A separate comparison of the same nanogel at 50 wt % in either toluene or methyl ethyl ketone provided very different flexural modulus results (1.14 vs. 0.85 GPa).
Figure 3:
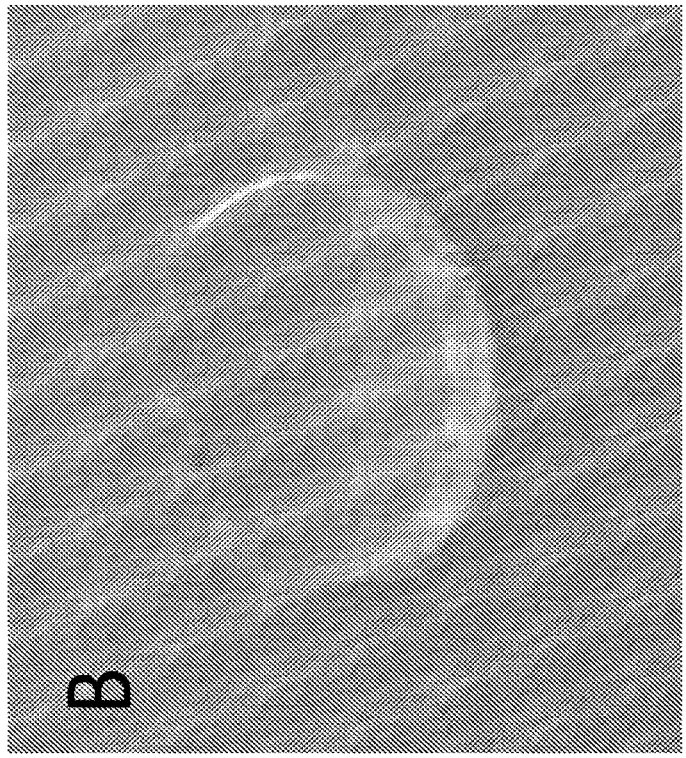

Examples of preliminary work with solvent dispersed nanogels are shown in FIG. 3 where at lower nanogel loading, porous 3D networks are created while at higher loading levels, the same nanogel in the same solvent gives a dense network due to fully contiguous overlapping distribution of nanogel structures at the time of polymerization. It should be recognized that very high nanogel loading (up to 80 wt % currently) can be achieved with the generation of very dense, novel network structures.

In one aspect, surprisingly, very hydrophobic building blocks (such as ≥50 mol % BisEMA or UDMA) can be used to prepare nanogels that are freely water dispersible. Therefore, the amphiphilic nanogels provide a route to dense, strong and homogeneous polymer networks can be formed even in the presence of water. Since adhesive resins such as BisGMA/HEMA are considerably more complex than single solvents, hydrogenated versions of these comonomers have been utilized to serve as inert nanogel carriers that will allow us to determine appropriate nanogel loading levels while also examining the for potential selective infiltration of one monomer over the other into certain nanogel materials using rheologic analyses in the monomeric state and DMA studies of polymerized materials. Solvent-dispersed nanogels will inform our work with nanogel additives in monomers but are also of significant interest for monomer-free adhesive formulations based only on reactive nanogels to provide dense water compatible polymer networks with a range of hydrophilic character.

In one aspect, a variety of water dispersible or near-water dispersible nanogels have been used to improve the wet strength of conventional water compatible polymers such as HEMA and poly(ethylene glycol)dimethacrylate (PEGDMA). With the hydrophilic character increasing as the monovinyl monomer component of the nanogel is changed from HEMA to $E_5$HEMA to $E_{10}$HEMA, this allows more hydrophobic divinyl monomers to be incorporated without sacrificing the water compatibility. In these amphiphilic nanogel structures, the compatibility or homogeneity between the hydrophobic and hydrophilic monomers is enforced by their preformed covalent attachment such that even in water, relatively hydrophobic nanogels can successfully be employed. To demonstrate this, 50 wt % loadings of various reactive nanogels were introduced into HEMA monomer giving well dispersed, completely transparent samples that were then photopolymerized in bulk. The dry modulus was in three-point bending mode and then additional samples were stored in water until equilibrium water uptake was achieved. The amount of water taken up and the wet modulus were determined and compared with the results from HEMA homopolymer (FIG. 17). It is evident that the dry modulus of the nanogel-modified pHEMA is dramatically enhanced; however, the differential between the control and the nanogel-modified materials in the wet state is even more pronounced. It is noteworthy that based on the water uptake results, there are examples of water compatible nano gels, such as $E_{10}$HEMA/BisGMA or $E_{10}$HEMA/BisEMA that actually increase the water uptake of the polymer while raising its wet modulus by over an order of magnitude.

In another embodiment, the disclosure relates to a method to provide a monomer-free macroscopic polymer network, the method comprising (i) combining a first monomer mixture comprising at least one functional monomer, at least one divinyl monomer, a difunctional chain transfer agent, and an initiator; (ii) polymerizing said first monomer mixture to form a functionalized nanogel; (iii) reacting the functionalized nanogel with a reactive olefinic compound to form a reactive nanogel with pendant olefinic groups; (iv) adding the reactive nanogel to an inert matrix to create a second mixture; and (v) polymerizing the second mixture, in which the nanogel loading exceeds the percolation threshold, to provide a monomer-free macroscopic polymer network with the strength solely dependent on the nanogel structure and loading level within the inert matrix. In one aspect, the pendant olefinic groups are selected from styryl, allyl, vinyl ether, and (meth)acrylate groups. In one aspect, the reactive olefinic compound is selected from (meth)acryloyl chloride, (meth)acrylic anhydride, (meth)acrylic acid, isocyanatoalkyl(meth)acrylate, isocyanatoethyl(meth)acrylate vinylbenzene chloride, chloroethyl vinyl ether, allyl chloride and isocyanatomethyl(meth)acrylate. In another aspect, the difunctional chain transfer agent is selected from mercaptoethanol, mercaptopropanol, 3-mercapto-2-butanol, 2-mercapto-3-butanol, 3-mercapto-2-methyl-butan-1-ol, 3-mercapto-3-methyl-hexan-1-ol, 3-mercaptohexanol, 3-mercaptopropionic acid, and cysteine. In one aspect, the reactive nanogel is added in about 10 wt % to about 80 wt %, compared to the weight of the inert matrix. In one aspect, the reactive nanogel is added in about 50 wt % to about 80 wt %, compared to the weight of the inert matrix. In one aspect, the reactive nanogel is added in about 15 wt % to about 35 wt %, compared to the weight of the inert matrix. In one aspect, the reactive nanogel is added in about 15 wt % to about 50 wt %, compared to the weight of the inert matrix.

EXAMPLES

In order to illustrate the disclosure, the following examples are included. However, it is to be understood that these examples do not limit the disclosure and are only meant to suggest a method of practicing the disclosure.

Example. Use of Nanogels to Decrease Oxygen-Inhibition

In one aspect, the addition of nanogels to existing adhesive resins or the use of solvent-dispersed nanogels was found to promote greater resistance to oxygen inhibition compared with open films of photocurable resins. As a demonstration, thin films (~30μm) of a BisGMA/TEGDMA resin were photocured open to the atmosphere or laminated between salt plates. Polymerization kinetics were monitored in real time by mid-IR and under the standardized conditions, the rate of the low (between 2% and 5%) conversion photopolymerization reactions were 1.19%/s and 0.02%/s for the closed and open control films, respectively (FIG. 4). This 60-fold reaction rate reduction due to oxygen inhibition is dramatically more severe compared with the results obtained with 40 wt % of added nanogel where the closed and open films gave reaction rates of 2.14%/s and 1.26%/s, respectively. It should be noted that while there was an approximate 50% reduction associated with oxygen inhibition between the nanogel-containing films, the open nanogel-modified film was equivalent in reactivity to the nanogel-free closed film control. The enhanced reactivity seen with nanogels is a result of the mobility restricted environment imposed by the monomer-swollen nanogel that selectively limits free radical termination. It is expected that as the nanogel size, structure and loading levels are varied, further benefits related to oxygen inhibition resistance can be achieved.

Previously, we have made nanogels from UDMA and several monovinyl monomers. Unrelated earlier studies that identified UDMA and methacrylic acid as a comonomer pair with the potential to form polymer networks with unusually high mechanical strength and modulus due to strong internal hydrogen bonding reinforcement between the carboxylic acid and the urethane functional groups. The strong bonding and overall bulk strength is not substantially diminished in the water-equilibrated state despite being a relatively hydrophilic copolymer (FIG. 5). We have used this same approach to form nanogels from a 2:1 molar ratio of methacrylic acid and UDMA (stoichiometrically balanced acid and urethane groups).

Example. Nanogel Preparation

A 70:30 mol ratio of ethoxylated hydroxyethyl methacrylate (EHEMA, n=10) and either tetraethylene glycol (TTEGDMA) or polyethylene glycol dimethacrylate (PEG400DMA) was dispersed in 4 times the volume of methyl ethyl ketone. Mercaptoethanol was added at 15 mol % relative to monomer along with 1 wt % 2,2-azobis(2- methylpropionitrile) (AIBN) as thermal initiator. The solution was purged with nitrogen while stirring for 30 min and then refluxed in an 80° C. oil bath for 3 h. Reduction of the vinyl peak in the mid IR (1630-1650 cm-1) indicated conversion of 85% for the EHEMA-TTEGDMA reaction and 87% for the EHEMA-PEG400DMA reaction. In each case the solution was removed from the oil bath after 3 h and allowed to cool to room temperature. 2-Isocyanatoethyl methacrylate (IEM) was added in a slight molar excess of mercaptoethanol along with a trace amount of dibutyltin dilaurate to catalyze the addition of pendant vinyl functionality to the nanogel. The reaction was allowed to proceed for 48 h after which a complete reduction in the isocyanate peak was observed in the mid-IR (2200-2340 cm-1). The product was precipitated into 10× the volume of hexane, redissolved in methylene chloride (note: solubility of the nanogel in either organic solvent or water) and dried under reduced pressure. The isolated yield for each nanogel was 75%. GPC analysis of the EHEMA-TTEGDMA nanogel indicated a hydrodynamic diameter of 11 nm and $M_n$ of 78500 (PDI=4.62). Similar analysis of the EHEMA-PEG400DMA nanogel was inconclusive.

Example. Gel Formation in HEMA or Water

Each nanogel was dispersed into hydroxyethyl methacrylate (HEMA) or water at 20, 40, 60, or 80 wt %. Photoinitiator {4-(2-hydroxyethoxy)phenyl-(2-hydroxy-2-propyl) ketone (Irgacure 2959} was added to HEMA at 1 wt % and water at 0.5 wt %. Samples were loaded into silicon rubber molds 5 mm in diameter and 0.5 mm thick and sealed between glass slides. For the HEMA dispersed reactive nanogel samples, time vinyl bond conversion was monitored in the near-IR (6100-6240 cm-1) during UV real-irradiation (365 nm, 10 mW/cm$^2$) (FIGS. 6 and 7). As formed (dry state), the gels with 40 and 60 wt % nanogel loading were hard, glassy materials while gels formed with 80 wt % nanogel were flexible. At 20 wt % loading the gel was fragile and loosely formed. When placed into water, the HEMA/nanogel materials with higher nanogel loading undergo less swelling and retain greater strength.

Under the conditions employed, IR analysis was not possible for any nanogels dispersed in water at 20-60 wt %. At 80 wt % the sample reached nearly 100% conversion after 10 min of irradiation (not shown). Samples containing 20 and 40 wt % nanogel were irradiated for 30 min and samples containing 60 and 80 wt % nanogel were irradiated for 15 min to observe any gel formation. Both nanogels at 20 wt % formed a very small gel that crumbled quickly when handled. Continuous flexible gels were formed at 40 wt %. Flexible, mechanically sound macrogels were obtained with the 60 and 80 wt % nanogel samples that appeared to effectively reach full conversion. No gels formed in water appeared glassy like the previously described HEMA gels. All gels formed in either HEMA or water were transparent and colorless regardless of the nanogel content.

Initial work focused on making more amphiphilic nanogels that maximize the hydrophobic content of water-compatible nanogels using IBMA/BisEMA/$E_{10}$HEMA. The BisEMA/IBMA nanogels are known to be quite hydrophobic materials that can be dispersed in organic solvents (or monomers) with mid-range polarities. These nanogels are isolated by precipitation from hexane or methanol with the latter demonstrating that they are incompatible with water. Nanogel compositions were made based on gradually increasing $E_{10}$HEMA contents (including 100 mol % $E_{10}$HEMA). We tried single-stage (polymerize everything at once) and dual-stage (add $E_{10}$HEMA after partially polymerizing IBMA/BisEMA) polymerizations. There were some differences noted in the solubility behavior of the nanogels prepared by single and dual processing (needs additional study). All the resulting nanogels could be precipitated and then redispersed in acetone, but none readily dispersed in water or even a 50/50 (v/v) mix of water and acetone.

Example. Hydrophilic and Reactive Nanogel

A series of more hydrophilic nanogels was prepared by combining $E_{10}$HEMA with several PEG dimethacrylates where the PEG spacer length was varied from an n of 4 (tetraethylene glycol dimethacrylate(TTEGDMA) to n~8, 20 or 80 (progressively more hydrophilic and water compatible as the PEG spacer length increases). As shown in FIG. 8, the $E_{10}$HEMA/TTEGDMA nanogel, prepared with mercaptoethanol as chain transfer agent and then made reactive by partial addition of isocyanatoethyl methacrylate, is freely water dispersible. When combined with Irgacure 2959 as a water soluble UV photoinitiator, quantitative conversion was obtained to yield solid polymer discs based on primarily interparticle reaction of the overlapping pendant methacrylate groups to create an extended 3D polymer network. Since IBMA/BisEMA/$E_{10}$HEMA nanogel was unsuccessful in terms of achieving water dispersibility, we eliminated IBMA and made nanogel using $E_{10}$HEMA/BisEMA 70/30, which dissolved readily in water (FIG. 9). We also prepared the 80:20 and 90:10 compositions, which provide even more hydrophilic nanogel materials. We used the $E_{10}$HEMA/BisEMA 70/30 nanogel additive in a model dental adhesive resin (BisGMA/HEMA 60:40 mass ratio) at 20 and 40 wt % and began to do water titrations looking at the saturation point using the UV/Vis detector and the optical bench to compare the unmodified and nanogel-modified resin for water compatibility. The result for the unmodified control and the adhesive resin with 20 wt % nanogel show that higher concentrations of water can be accommodated while retaining a stable single phase (FIG. 10). The stabilizing effect of the 40 wt % nanogel-loaded adhesive towards added water has yet to be determined but there is an expectation that with extensive nanogel overlap, the water stability of the resin system will be further enhanced. Most studies focused on water interactions with adhesive resins probe the water-based de-mixing that occurs with the adhesive in the monomeric state. (Ye, 2011) While this is a substantial practical problem, it should also be recognized that a marginally thermodynamically compatible system can be pushed into instability through polymerization-induced phase separation. We have studied this phenomenon extensively and have demonstrated that prior to gelation, liquid-liquid de-mixing of homogeneous comonomer mixtures or mixtures of monomers with solvent (including water), can occur very rapidly during polymerization to yield highly varied domain morphologies and phases that represent very substantial compositional differences.

Example. Nanogel Solvent Dispersion

The dispersion of relatively hydrophobic reactive nanogels in inert organic solvents containing photoinitiator provides a method to examine how the solvent polarity, nanogel structure, reactive group concentration on and within the nanogel, and nanogel concentration in the solvent affect the reaction kinetics potential and the resulting polymer network structure/properties (if nanogel overlap permits extensive interparticle reactions). A reactive nanogel was dispersed in methyl ethyl ketone (MEK) at various loading levels and the clear solutions were irradiated with UV light. At 10 or 20 wt % nanogel, the solutions remained clear with no gel fraction evident. The 30 wt % nanogel returned incoherent fragile gel particles. At or above 40 wt % of this particular nanogel in MEK as solvent, a monolithic polymer macrogel was formed with varied sol/gel fractions (Table 1; after accounting for the solvent content). The same nanogel was dispersed in tetrahydrofuran at 10 wt % nanogel loading and the mixture irradiated with DMPA present. The reactive nanogel reached approximately 20% conversion and the mixture remained clear following irradiation with no apparent increase in solution viscosity. The dispersed polymeric material was isolated by precipitation and analyzed by GPC for comparison with the original nanogel (Table 2). The results of the analysis indicated that only a relatively minor amount of iterparticle reaction took place to covalently link a small fraction of the nanogels together probably limited to dimer or trimer structures.

Varied nanogel (IBMA/UDMA 80:20 15 mol % mercaptoethanol and IEM) concentrations were dispersed in MEK with 0.1 wt % DMPA. The clear solutions were photocured with 365 nm light at 80 mW/cm$^2$ for 600 s. Conversion was measured by NIR and mass loss determined gravimetrically for specimens extracted with fresh MEK. Results are shown in Table 1.

TABLE 1

Mass loss (sol fraction) of photocured nanogel dispersions in MEK

| Wt % Nanogel | % Conversion | Average Mass Loss % (SD) |
|---|---|---|
| 40 | 53 | 22.8 (2.7) |
| 50 | 57 | 13.6 (1.7) |
| 60 | 71 | 8.5 (0.6) |
| 70 | 88 | 3.4 (1.1) |

TABLE 2

Characterization by GPC for the pre-and post-irradiated nanogel

| Condition | $M_n$ (Da) | PDI | IV | $R_h$ (nm) | α |
|---|---|---|---|---|---|
| Pre-irradiation | 15,134 | 2.68 | 0.0553 | 3.91 | 0.334 |
| Post-irradiation | 20,792 | 2.58 | 0.0618 | 4.45 | 0.399 |

Where: $M_n$=number average molecular weight; PDI=polydispersity index; IV=inherent viscosity; $R_h$=hydrodynamic radius; α=Mark-Houwink exponent.

Example. Refractive Index of Nanogel Dispersions

Nanogel dispersions in solvent or monomer are completely transparent due to the small nanoparticle size (<50 nm), the lack of nanogel aggregation into larger light scattering centers, and the infiltration of solvent or monomer into the nanogel structure, which limits potential refractive index disparities at the interface. However, the introduction of nanogels into monomer (or solvent) can be used to adjust the bulk refractive index in direct proportion to the absolute difference in refractive index between the bulk nanogel and the dispersion media as well as the concentration of nanogel used. As shown in FIG. 11, the bulk nanogel refractive index can be determined by extrapolation to a 100% nanogel concentration with good agreement demonstrated using several solvents. Related to this, we have synthesized a high refractive index nanogel from the aromatic di- and mono-acrylate monomers shown in FIG. 11. By use of the same extrapolation method, the projected bulk refractive index of the nanogel is 1.58, which while significantly higher than that of the IBMA/UDMA nanogel, is actually much lower than expected based on the refractive indices of the constituent monomers used to prepare the nanogel.

Example. Solvent Dispersion

The choice of the solvent used to disperse the nanogel at the time of polymerization affects the overall degree of conversion, the ratio of intra- to inter-particle reaction and the structure of the extended macrogelled network as demonstrated in FIG. 12.

Example. Nanogel Conversion in Various Solvent Systems

The reaction kinetics of any given solvent-dispersed nanogel are affected significantly by the concentration of reactive groups on the nanogel, the nanogel structure, the concentration of nanogel dispersed in the solvent and the selection of the solvent (solubility parameter matching or mismatch between the nanogel and the solvent). The differences in reaction rate and conversion resulting from nanogel loading and solvent choice are shown in FIG. 13. In most cases, relatively low conversion is attained for well dispersed nanogels at low loading levels while overlapping nanogels at high loading levels promote high conversion and rates of reaction. Related to the variation in Tg for nanogel-based network formation conducted in different solvents (shown in FIG. 12), the effect of solvent choice on potential mechanical strength properties of the extended macrogel polymeric materials derived from one nanogel at a fixed loading level is demonstrated in FIG. 14.

Related to the modification of polymer mechanical properties by nanogel loading level or the choice of the solvent used to disperse the nanogel, the properties of the nanogel itself can be manipulated quite significantly. We have developed a series of nanogels that based on their composition offer a wide range of glass transition temperature (FIG. 15). This allows us to raise or lower the overall bulk modulus of a polymer that incorporates the reactive nanogel as an additive or to vary the properties of a macrogel structure prepared from solvent-dispersed nanogels or even as the bulk polymer of low Tg nanogels. The structural heterogeneity of polymers formed by low concentrations of nanogel dispersed in monomer is shown in the DMA results of FIG. 16. As the nanogel content is increased in the monomer, the resulting polymer shows progressively less bulk matrix polymer and the nanogel infused network becomes the exclusive morphological feature beyond about 30 wt % nanogel loading where interparticle spacing is very small or virtually nonexistent.

In one aspect, the disclosure provides a method of formation of nanogels from a non-acrylic monomer basis. The combination of (meth)acrylamide and bis(meth)acrylamide monomers with a chain transfer agent allows preparation of ester-free nanogels that can yield polymer networks that are resistant to acidic hydrolysis and enzymatic attack.

Example. Water-Dispersible Nanogels

Table 3 discloses nanogel compositions with conversion and results with respect to water dispersibility. As shown, a water dispersible nanogel can be prepared from a monomer composition comprising from about 50 wt % EHEMA to about 90 wt % EHEMA.

TABLE 3

Preparation of Water-Dispersible Nanogels

| TRIAL | MATERIAL | CONVERSION | RESULT |
|---|---|---|---|
| 1 | Isobornylmethacrylate (IBMA)/BisEMA/EHEMA(10)65/30/15 mol %, 15 mol % mercaptoethanol(ME), 4:1Toluene, 1 wt % A | 60% | Not H2O dispersible, partially dispersible in 50/50 H2O/acetone |
| 2 | IMBA/BisEMA/EHEMA(10)55/30/15 mol %, 15 mol % ME, 4:1Toluene, 1 wt % AIBN, 15 mol % IEM | 41% | Not H2O dispersible |
| 3 | IMBA/BisEMA/EHEMA(10)55/30/15 mol %, 15 mol % ME, 4:1MethylEthylKetone(MEK), 1 wt % AIBN, 15 mol % IEM | 69% | Not H2O dispersible |
| 4 | IBMA/BisEMA70/30 mol %, 15 mol % ME, 4:1 Toluene, 2.5 wt % BAPO-polymerize to 70% conversion, then add 15 mol % EHEMA (10), BAPO, and continue polymerization | Stage1-55% Stage2-54% | Not H2O dispersible |
| 5 | EHEMA(10)/Tetraethyleneglycoldimethacrylate(TTEGDMA)70/30 mol %, 15 mol % ME, 4:1MEK, 1 wt % AIBN | 66% | H2O dispersible |
| 6 | IBMA/Tetradecanedioldimethacrylate70/30 mol %, 15 mol % ME, 4:1Toluene, 1 wt % AIBN | 78% | No-precipitate |
| 7 | IBMA/BisEMA70/30 mol %, 65 mol % EHEMA(10), 15 mol % ME, 4:1MEK, 1 wt % AIBN | 30% | Macrogelled |
| 8 | HEMA/BisEMA70/30 mol %, 15 mol % ME, 4:1MEK, 1 wt % AIBN | 57% | Macrogelled |
| 9 | EHEMA(10)/BisEMA70/30 mol %, 15 mol % ME, 4:1MEK, 1 wt % AIBN, 15 mol % IEM | 89% | H2O dispersible |
| 10 | EHEMA(10)/BisEMA80/20 mol %, 15 mol % ME, 4:1MEK, 1 wt % AIBN, 15 mol % IEM | 63% | H2O dispersible |
| 11 | EHEMA(10)/BisEMA90/10 mol %, 15 mol % ME, 4:1MEK, 1 wt % AIBN, 15 mol % IEM | 88% | H2O dispersible |
| 12 | EHEMA(10)/TTEGDMA50/50 mol %, 15 mol % ME, 4:1MEK, 1 wt % AIBN, 0% IEM | 40% | H2O dispersible, but partially polymerized in vial |
| 13 | EHEMA(10)/Polyethyleneglycoldimethacrylate875(PEG875)50/50 mol %, 15 mol % ME, 4:1MEK, 1 wt % AIBN, 15 mol % IEM | 70% | H2O dispersible, macrogels easily |
| 14 | EHEMA(10)/Polyethyleneglycoldimethacrylate400(PEG400)50/50 mol %, 15 mol % ME, 4:1MEK, 1 wt % AIBN, 15 mol % IEM | 70% | H2O dispersible, low yield |
| 15 | EHEMA(10)/PEG87550/50 mol %, 15 mol % ME, 4:1MEK, 1 wt % AIBN, varied [IEM]0-15 mol % | 80% | 0% IEM-not H2O dispersible; 10% IEM-H2O dispersible; 20% IEM-cloudy in H2O; 30% IEM-H2O dispersible |
| 16 | EHEMA(10)/Polyethyleneglycoldimethacrylate4600(PEG4600)90/10 mol %, 15 mol % ME, 4:1MEK, 1 wt % AIBN, 15 mol % IEM | 70% | H2O dispersible |
| 17 | EHEMA(10)/Polyethyleneglycoldimethacrylate875(PEG875)70/30 mol %, 15 mol % ME, 4:1MEK, 1 wt % AIBN, 30 mol % IEM | 78% | H2O dispersible |

Example: Nanogel Preparation

Nanogels were prepared from ethoxylated hydroxyethyl methacrylate ($E_{10}HEMA$) and poly(ethylene glycol) dimethacrylate ($PEG_{875}DMA$), which were combined at a 70:30 molar ratio and polymerized in methyl ethyl ketone with azobisisobutyronitrile as thermally active initiator and mercaptoethanol as chain transfer agent. After the nanogel synthesis was complete either 10, 20 or 30 mol % of isocyanatoethylmethacrylate (IEM) was added to react with the hydroxyl groups associated with both the EHEMA and mercaptoethanol functionality. The nanogels were isolated by precipitation and characterized by gel permeation chromatography. All the nanogels were readily dispersible in water.

Reaction rates for photoploymerization and degree of conversion of Nanogel: The reactive nanogels were dispersed in water at either a 75 wt % or 25 wt % loading level (designated below as 25 wt % water and 75 wt % water, respectively), both of which are above the percolation threshold where the nano gels are capable of linking together during polymerization to form macroscopic network structures. A water compatible UV active photoinitiator (I2959) was included and the nanogel dispersions were photopolymerized to high conversion yielding monolithic network structures. Real-time near-IR spectroscopy was used to monitor the rate of the nanogel photopolymerization reaction and the final degree of conversion achieved. Slightly higher conversion (~98-99%) was achieved with the more densely overlapping nanogel dispersions in the groups containing the 25 wt % water concentration. No significant differences in conversion were observed based on the various levels of IEM-based reactive groups present on the nanogels. The 20 mol % IEM incorporation gave the highest reaction rates, again with the more concentrated nanogel loading level producing moderately higher reaction rates.

Under lower light intensity polymerization conditions that allow greater differentiation, raising the reactive group concentration does have a modest effect on increasing conversion during macrogel formation but primarily at relatively low nanogel loading levels.

Discs of the as formed water-infused gel samples obtained after photopolymerization were dehydrated and weighed. The dry discs were then placed in distilled water at room temperature with free swelling allowed to progress to equilibrium. The results demonstrate that the mass of water taken up in the gels correlated with the mass of the dried nanogel samples, which was greater for samples prepared at higher nanogel loading levels. The significantly higher reactive group densities in the 20 and 30 mol % IEM treated samples have only a modest effect in limiting the swelling for any given nanogel loading used in the polymerization. It should also be recognized that when the samples were re-dried after reaching their equilibrium water uptake, the mass returned to that of the initially formed gel, which means that virtually all the nanogel was covalently attached to the macroscopic gel that formed in water. The water uptake results demonstrated with the normalized data illustrate that the greater nano gel loading quite significantly limits the swelling potential of the macrogel polymer network. Again, the modest reduction in swelling potential is seen for the increasing reactive group concentrations on the nanogels. In all cases, significantly greater amounts of water are taken up during the free swelling compared with the amount of water that was initially present when the macrogel was formed.

In addition to the $E_{10}$HEMA/PEG875DMA nanogels, similar water compatible nanogels were made from combinations of $E_{10}$HEMA with either tetraethylene glycol dimethacrylate (TTEGDMA), $PEG_{400}$ dimethacrylate ($PEG_{400}$DMA), or urethane dimethacrylate (UDMA). The water-equilibrated compressive modulus of the macrogels produced by the polymerization of all these nanogels was consistently between 1 and 10 MPa. As a comparison, the wet modulus of poly(2-hydroxyethyl methacrylate) (pHEMA) is well below 1 MPa. A nanogel obtained by polymerization of hydroxyethyl acrylate (HEA) and glycerol 1,3-diglycerolate diacrylate (GDD) was also water compatible and provided very high modulus polymer monoliths. For example, when this reactive HEA/GDD nanogel was polymerized at a 50 wt % concentration in ethanol, the flexural modulus was >100 MPa. The substitution of the inert ethanol dispersant with reactive HEMA monomer infused into the overlapping nanogel at the same 50 wt % loading level provided a denser polymer network, but with no increase in the modulus compared with the nanogel-only network formed in the presence of the inert solvent. This indicates the nanogel-based network structure alone has excellent mechanical strength properties in the presence of water.

Example: Nanogel Preparation

A water compatible nanogel was obtained based on $E_{10}$HEMA/BisEMA (70:30 molar ratio) with 15 mol % of mercaptoethanol as chain transfer agent by solution polymerization in methyl ethyl ketone. Reactive groups were appended to the nanogel particles by reaction with either 15 or 30 mol % IEM. These two nanogels have bulk glass transition temperatures (Tg's) well below room temperature, which means these are viscous oily liquids under ambient conditions (Table 5).

TABLE 5

Glass transition temperatures (° C.) of nanogels and their bulk polymers

|  | 15% IEM nanogel | 30% IEM nanogel | 15% IEM nanogel polymerized | 30% IEM nanogel polymerized |
| --- | --- | --- | --- | --- |
| Average | −32.4 | −22.6 | 4.8 | 9.9 |
| SD | 1.3 | 0.9 | 1.5 | 0.1 |

Rather than dispersing these nanogels in water to conduct polymerizations between the overlapping, water-swollen nanogel particles, these nanogels were photopolymerized in the bulk, solvent-free state. The Tg is increased by approximately 30-40° C. by nanogel polymerization. Both nanogel samples underwent rapid photopolymerization to essentially complete conversion. This demonstrates that monomer free, solvent free nanogel polymerization is practically possible. The volumetric polymerization shrinkage associated with these bulk nanogel polymerizations was approximately 2.4-2.9%, which is considerably less than the 5-15% shrinkage typically noted with dimethacrylate monomer polymerizations.

Example: Nanogel Preparation

Nanogels based on $E_{10}$HEMA-TTEGDMA (70:30) and $E_{10}$HEMA-UDMA (70:30) were synthesized using 15 mol % mercaptoethanol in a 6-fold dilution with methyl ethyl ketone. Acid-functionalized versions of these same nanogels were synthesized using 15 mol % 3-mercaptopropionic acid (MPA) as the chain transfer agent in place of mercaptoethanol (ME). An $E_5$HEMA-UDMA nanogel was synthesized using at 50:50 mol ratio of ME:3-MPA for an overall composition of 15 mol %.

The presence of acid decreases the modulus in the $E_{10}$HEMA-TTEGDMA networks, which may be attributed to the greater swelling of the acid-functionalized nanogels and subsequent decrease in crosslinking density. The moduli are reported for desiccated networks but if the prepolymerized nanogel is more expanded in solution, that conformation may persist in the final network. Conversely, adding acid functionality significantly boosts the modulus in the EHEMA-UDMA nanogels due to increased intermolecular hydrogen bonding. The reported acid content diminishes the swelling in these nanogels which correlates with the observed increase in crosslinking density. Synthesizing $E_{10}$FIEMA-UDMA nanogels with 25:75, 50:50, or 75:25 ME:3-MPA does not statistically change the modulus, though the swelling increases with increasing acid content.

Switching from $E_{10}$HEMA to $E_5$HEMA increases the nanogel crosslinking density but also renders $E_5$HEMA-UDMA less compatible with water (not fully miscible/dispersible, where the $E_{10}$1-1EMA-UDMA is fully miscible). However, a 50:50 wt solution of ethanol and water is sufficient to disperse these nanogels. Forming networks from acid functionalized $E_5$HEMA-UDMA in ethanol increases the modulus at 75 wt % loading but a 50% solution is only marginally higher than the neutral $E_{10}$HEMA-UDMA networks. However, adding water to the prepolymer solution greatly increases the modulus and forms much stronger networks. The presence of less polar ethanol allows the UDMA crosslinks to expand and transition from intra- to intermolecular hydrogen bonding, while adding water appears to serve as a bridge between acid groups and adjacent urethane chains or between urethane groups on adjacent chains, drawing these groups together and allowing for a dense covalent and non-covalent crosslinks in the final network.

Example: Use of Nanogel to Improve the Wet Strength of Conventional Water Compatible Polymers A variety of water dispersible or near-water dispersible nanogels have been used to improve the wet strength of conventional water compatible polymers such as HEMA and PEGDMA. A 50 wt % loadings of various reactive nanogels were introduced into HEMA monomer giving well dispersed, completely transparent samples that were then photopolymerized in bulk. The dry modulus was in three-point bending mode and then additional samples were stored in water until equilibrium water uptake was achieved. The amount of water taken up and the wet modulus were determined and compared with the results from HEMA homopolymer (FIG. 17). The dry modulus of the nanogel-modified pHEMA is dramatically enhanced; however, the differential between the control and the nanogel-modified materials in the wet state is even more pronounced.

APPENDIX

Yi, Han; Lewis, Steven; Makhija, Manish; Dailing, Eric; Stansbury, Jeff, Development and Application of Water-dispersible Nanogels, AADR Annual Meeting, Tampa, Fla. March 21-24, Powerpoint Presentation to be presented Mar. 23, 2012. 10 pages.

I claim:

1. A method to prepare an adhesive polymer, the method comprising:
    (i) combining a first monomer mixture comprising at least one functional monomer, at least one divinyl monomer, a difunctional chain transfer agent, and an initiator, wherein the at least one functional monomer is hydrophilic or amphiphilic and said at least one hydrophilic or amphiphilic functional monomer is at least 50 mol% of the total moles of monomer in the first monomer mixture;
    (ii) polymerizing said first monomer mixture to form a water dispersible functionalized nanogel;
    (iii) reacting the water dispersible functionalized nanogel with a reactive olefinic compound to form a water dispersible reactive nanogel with pendant olefinic groups;
    (iv) adding the water dispersible reactive nanogel to an adhesive resin to create a second mixture; and
    (v) polymerizing the second mixture to provide the adhesive polymer.

2. The method according to claim 1, wherein the pendant olefinic groups are selected from styryl, allyl, vinyl ether, and (meth)acrylate groups.

3. The method according to claim 1, wherein the reactive olefinic compound is selected from (meth)acryloyl chloride, (meth)acrylic anhydride, (meth)acrylic acid, isocyanatoalkyl(meth)acrylate, isocyanatoethyl(meth)acrylate vinylbenzene chloride, chloroethyl vinyl ether, allyl chloride and isocyanatomethyl(meth)acrylate.

4. The method according to claim 1, wherein the difunctional chain transfer agent is selected from mercaptoethanol, mercaptopropanol, 3-mercapto-2-butanol, 2-mercapto-3-butanol, 3-mercapto-2-methyl-butan-1-ol, 3-mercapto-3-methyl-hexan-1-ol, 3-mercaptohexanol, 3-mercaptopropionic acid, and cysteine.

5. The method according to claim 1, wherein the water dispersible reactive nanogel is added in about 10 wt % to about 80 wt %, compared to the weight of the adhesive resin.

6. The method according to claim 1, wherein the water dispersible reactive nanogel is added in about 50 wt % to about 80 wt %, compared to the weight of the adhesive resin.

7. The method according to claim 1, wherein the water dispersible reactive nanogel is added in about 15 wt % to about 50 wt %, compared to the weight of the adhesive resin.

8. The method according to claim 1, wherein the water dispersible reactive nanogel is added in about 15 wt % to about 35 wt %, compared to the weight of the adhesive resin.

9. The method of claim 1, wherein the at least one functional monomer is hydrophilic and the at least one divinyl monomer is hydrophilic.

10. The method of claim 1, wherein the at least one functional monomer is selected from the group consisting of poly(ethylene glycol) mono methacrylate, polyethoxy ethyl methacrylate (ENEMA), and (meth)acrylamide.

11. The method of claim 1, wherein the at least one functional monomer is polyethoxy ethyl methacrylate (ENEMA) at an amount in a range of 50 mol % to 90 mol % of the total moles of monomer in the first monomer mixture.

12. The method of claim 11, wherein the polyethoxy ethyl methacrylate (ENEMA) is polyethoxy (10) ethyl methacrylate (E10 HEMA or HEMA 10).

* * * * *